United States Patent
Rosenbaum et al.

(10) Patent No.: US 12,491,234 B2
(45) Date of Patent: Dec. 9, 2025

(54) METHODS AND COMPOSITIONS COMPRISING SURFACTANT PROTEIN D (SP-D)

(71) Applicant: Airway Therapeutics, Inc., Marietta, GA (US)

(72) Inventors: Jan Susan Rosenbaum, Cincinnati, OH (US); Mark Cornell Manning, Johnstown, CO (US); Derrick S. Katayama, Timnath, CO (US); Giovanni M. Pauletti, Cincinnati, OH (US); Shawn Grant, Cincinnati, OH (US); Ryan Holcomb, Cincinnati, OH (US)

(73) Assignee: Airway Therapeutics, Inc., Marietta, GA (US)

( * ) Notice: Subject to any disclaimer, the term of this patent is extended or adjusted under 35 U.S.C. 154(b) by 718 days.

(21) Appl. No.: 17/041,719

(22) PCT Filed: Mar. 27, 2019

(86) PCT No.: PCT/US2019/024305
§ 371 (c)(1),
(2) Date: Sep. 25, 2020

(87) PCT Pub. No.: WO2019/191247
PCT Pub. Date: Oct. 3, 2019

(65) Prior Publication Data
US 2021/0121536 A1    Apr. 29, 2021

Related U.S. Application Data

(60) Provisional application No. 62/650,142, filed on Mar. 29, 2018.

(51) Int. Cl.
| | |
|---|---|
| A61K 38/17 | (2006.01) |
| A61K 9/19 | (2006.01) |
| A61K 47/02 | (2006.01) |
| A61K 47/18 | (2017.01) |
| A61K 47/22 | (2006.01) |
| A61K 47/26 | (2006.01) |

(52) U.S. Cl.
CPC .............. *A61K 38/395* (2013.01); *A61K 9/19* (2013.01); *A61K 47/02* (2013.01); *A61K 47/183* (2013.01); *A61K 47/22* (2013.01); *A61K 47/26* (2013.01)

(58) Field of Classification Search
CPC ........ A61K 38/395; A61K 9/19; A61K 47/02; A61K 47/183; A61K 47/22; A61K 47/26; A61K 9/0078; A61K 38/00; A61K 9/0082; A61P 11/00; C07K 14/785
See application file for complete search history.

(56) References Cited

U.S. PATENT DOCUMENTS

| | | | |
|---|---|---|---|
| 8,865,643 B2 | 10/2014 | Clark et al. | |
| 9,370,555 B2* | 6/2016 | Whitsett | A61K 38/17 |
| 9,492,503 B2* | 11/2016 | Whitsett | A61P 11/00 |
| 2011/0189104 A1 | 8/2011 | Whitsett et al. | |
| 2013/0316980 A1 | 11/2013 | Tchirikov | |
| 2014/0302158 A1 | 10/2014 | Cabrera et al. | |
| 2017/0189527 A1* | 7/2017 | Rinaldi | A61P 37/06 |
| 2019/0071693 A1 | 3/2019 | Rosenbaum et al. | |
| 2019/0071694 A1 | 3/2019 | Rosenbaum et al. | |

FOREIGN PATENT DOCUMENTS

| | | |
|---|---|---|
| EP | 1134202 A1 | 9/2001 |
| JP | 2001-033450 A | 2/2001 |
| JP | 2015-527402 A | 9/2015 |
| RU | 2603093 C2 | 11/2016 |
| RU | 2643762 C2 | 2/2018 |
| WO | 01/80633 A2 | 11/2001 |
| WO | 2011/017070 A1 | 2/2011 |
| WO | WO 2012/093087 | 7/2012 |
| WO | WO 2017/143024 | 8/2017 |
| WO | WO 2019/191254 | 10/2019 |

OTHER PUBLICATIONS

Sarker et al., Lung Surfactant Protein A (SP-A) Interactions with Model Lung Surfactant Lipids and an SP-B Fragment. Biochem. (Jun. 2011), 50(22): 4867-4876.
White et al., Increased antiviral and opsonic activity of a highly multimerized collectin chimera. Biochem Biophys Res Commun. (2001) 286: 206-213.
Arroyo et al. Structural Characterization of Human Pulmonary Surfactant Protein SP-D by Atomic Force Microscopy. Biophysical J. (2017) 112(3):503a Abstract 2478-Pos.
Arroyo et al., Supramolecular Assembly of Human Pulmonary Surfactant Protein SP-D. J Mol Biol. (2018) 430(10):1495-1509.
Awasthi S., Surfactant protein (SP)-A and SP-D as antimicrobial and immunotherapeutic agents. Recent Pat Antiinfect Drug Discov. (2010) 5(2):115-123.
Clark et al., Structural requirements for SP-D function in vitro and in vivo: therapeutic potential of recombinant SP-D. Immunobiology (2002) 205(4-5):619-631.
Clements J.A., Functions of the alveolar lining, Am Rev Respir Dis (1977) 115(6 Pt 2):67-71.
Crouch et al., Molecular structure of pulmonary surfactant protein D (SP-D). J Biol Chem. (1994) 269(25):17311-17319.
Crouch E.C., Surfactant protein-D and pulmonary host defense. Respir Res. (2000) 1(2):93-108.
Crouch et al., Contributions of phenylalanine 335 to ligand recognition by human surfactant protein D: ring interactions with SP-D ligands. J Biol Chem., (2006) 281(26):18008-18014.

(Continued)

*Primary Examiner* — Sudhakar Katakam
(74) *Attorney, Agent, or Firm* — Quicker Law, LLC

(57) ABSTRACT

Some embodiments provided herein relate to methods and pharmaceutical compositions comprising recombinant human surfactant protein D or active fragments thereof. Some such embodiments include solutions or suspensions, and lyophilized solid forms of recombinant human surfactant protein D or active fragments thereof.

22 Claims, 5 Drawing Sheets
Specification includes a Sequence Listing.

(56) References Cited

OTHER PUBLICATIONS

Debye P., Molecular-weight determination by light scattering. J Phys Chem., (1947) 51:18-32.
Dodagatta-Marri et al., Purification of surfactant protein D (SP-D) from pooled amniotic fluid and bronchoalveolar lavage. Methods Mol Biol. (2014) 100:273-290.
Griese M., Pulmonary surfactant in health and human lung diseases: State of the art, Eur Respir J (1999) 13:1455-1476.
Haagsman et al., Surfactant collectins and innate immunity. Neonatology (2008) 93:288-294.
Håkansson et al., Collectin structure: a review. Protein Sci. (2000) 9:1607-1617.
Hartshorn et al., Role of viral hemagglutinin glycosylation in anti-influenza activities of recombinant surfactant protein D. Resp Res. (2008) 9(1):65 in 12 pgs.
Ikegami et al., Intratracheal Recombinant Surfactant Protein D Prevents Endotoxin Shock in the Newborn Preterm Lamb. Am J Respir Crit Care Med. (2006) 173(12):1342-1347.
Kingma et al., Correction of pulmonary abnormalities in Sftpd-/- mice requires the collagenous domain of surfactant protein D. J Biol Chem. (2006) 281:24496-24505.
Knudsen et al. A recombinant fragment of human surfactant protein D lacking the short collagen-like stalk fails to correct morphological alterations in lungs of SP-D deficient mice. The Anatomical Record (2009) 292(2):183-189.
Knudsen et al., Surfactant protein D (SP-D) deficiency is attenuated in humanised mice expressing the Met(11)Thr short nucleotide polymorphism of SP-D: implications for surfactant metabolism in the lung. J Anat. (2013) 223(6):581-592.
Korfhagen et al., Surfactant protein-D regulates surfactant phospholipid homeostasis in vivo. J Biol Chem. (1998) 273(43):28438-28443.
Malash et al., Association of TLR polymorphisms with bronchopulmonary dysplasia. Gene (2016) 592(1):23-28.
Ogasawara et al., The role of the amino-terminal domain and the collagenous region in the structure and the function of rat surfactant protein D. J Biol Chem. (1995) 270(32):19052-19058.
Robertson et al., Principles of surfactant replacement, Biochim Biophys Acta (1998) 1408:346-361.
Sato et al., Surfactant Protein-D Inhibits Lung Inflammation Caused by Ventilation in Premature Newborn Lambs. Am J Respir Crit Care Med. (2010) 181(10):1098-1105.
Strong et al., A novel method of purifying lung surfactant proteins A and D from the lunglavage of alveolar proteinosis patients and from pooled amniotic fluid. J Immunol Methods. (1998) 220(1-2):139-149.
Vieira et al., Structure, Genetics and Function of the Pulmonary Associated Surfactant Proteins A and D: The Extra-Pulmonary Role of These C Type Lectins.Ann Anat. (2017) 211:184-201.
Wagner et al., Asymmetric flow field-flow fractionation in the field of nanomedicine. Anal Chem (2014) 86(11):5201-5210.
Wert et al., Increased metalloproteinase activity, oxidant production, and emphysema in surfactant protein D gene-inactivated mice. PNAS (2000) 97(11): 5972-5977.
White et al., Multimerization of surfactant protein D, but not its collagen domain, is required for antiviral and opsonic activities related to influenza virus. J Immunol. (2008) 181(11):7936-7943.
Winkler et al., Impact of a Met(11) Thr single nucleotide polymorphism of surfactant protein D on allergic airway inflammation in a murine asthma model. Exp Lung Res. (2014) 40(4):154-163.
Wold et al., PLS-regression: a basic tool of chemometrics. Chemom. Intell. Lab. Syst. (2001) 58: 109-130.
Yamazoe et al., Pulmonary surfactant protein D inhibits lipopolysaccharide (LPS)-inducedinflammatory cell responses by altering LPS binding to its receptors. J Biol Chem. (2008) 283(51):35878-35888.
Zhang et al., Activity of pulmonary surfactant protein-D (SP-D) in vivo is dependent on oligomeric structure. J Biol Chem (2001) 276(22):19214-19219.

Zimm B.H., The scattering of light and the radial distribution function of high polymer solutions. J Chem Physics (1948) 16(12):1093-1099.
Zuo et al., Current perspective in pulmonary surfactant—Inhibition, enhancement and evaluation, Biochim Biophys Acta (2008) 1778:1947-1977.
International Search Report and Written Opinion dated Jun. 25, 2019 for PCT/US2019/24305.
Hickling, T. et al. "A recombinant trimeric surfactant protein D carbohydrate recognition domain inhibits respiratory syncytial virus infection in vitro and in vivo." European Journal of Immunology, vol. 29 Issue 11, 1999, pp. 3478-3484.
Ikegami, M. et al. "Surfactant Protein-D and Surfactant Inhibit Endotoxin-Induced Pulmonary Inflammation." Chest, vol. 132 No. 5, 2007, pp. 1447-1454.
Zbacnik, T. et al. "Role of Buffers in Protein Formulations." Journal of Pharmaceutical Sciences, vol. 106 No. 3, 2017, pp. 713-733.
Stahle, L. et al. "Multivariate Data Analysis and Experimental Design in Biomedical Research." Progress in Medicinal Chemistry, vol. 25, 1988, pp. 291-338. (Abstract only).
Han, Y. et al. "Effects of sugar additives on protein stability of recombinant human serum albumin during lyophilization and storage." Arch Pharm Res, vol. 30 No. 9, 2007, pp. 1124-1131. (Abstract only).
New Jersey Department of Health and Senior Services. Hazardous Substance Fact Sheet: Calcium Hypochlorite, Apr. 2003. Retrieved from https://nj.gov/health/eoh/rtkweb/documents/fs/0323.pdf.
Tang, X. et al. Design of freeze-drying processes for pharmaceuticals: practical advice. Pharmaceutical Research, 2004, vol. 21 No. 2, p. 191-200.
Schaefers, M. "Reconstructing reconstitution." Packaging Digest, Dec. 21, 2015. Retrieved from https://www.packagingdigest.com/print/19042.
Carpenter, J.F. et al. "Rational Design of Stable Lyophilized Protein Formulations: Theory and Practice." In Rational Design of Stable Protein Formulations—Theory and Practice, JF Carpenter and MC Manning, eds. Pharmaceutical Biotechnology, 2002, Springer, Boston, pp. 109-133.
Patel, P. et al. "Drug-Excipient compatibility studies: First step for dosage form development." The Pharma Innovation Journal, 2015, vol. 4, No. 5, pp. 14-20.
Brooke, D. et al. "Universal buffers for use in biochemistry and biophysical experiments." AIMS Biophysics, 2015, vol. 2 No. 3, pp. 336-342.
Vuk-Pavlovic, Z. et al. "Carbohydrate recognition domain of surfactant protein D mediates interactions with Pneumocystis carinii glycoprotein A." Am J Respir Cell Mol Biol, 2001, vol. 24 No. 4, pp. 475-484.
Tonnis, W. et al. "Size and molecular flexibility of sugars determine the storage stability of freeze-dried proteins", Molecular Pharmaceutics, 2015, vol. 12, pp. 684-694.
Sako, D. et al. "Characterization of the ligand binding functionality of the extracellular domain of activin receptor type IIB." J Biol Chem, 2010, vol. 285 No. 27, pp. 21037-21048.
Bharate, S. et al. "Interactions and incompatibilities of pharmaceutical excipients with active pharmaceutical ingredients: a comprehensive review." Journal of Excipients and Food Chemicals, 2010, vol. 1 No. 3, pp. 3-26.
Muller, S. et al. "Spliceosomal peptide P140 for immunotherapy of systemic lupus erythematosus: Results of an early phase II clinical trial." Arthritis & Rheumatism, 2008, vol. 58 No. 12, pp. 3873-3883.
Sorensen, G. "Surfactant Protein D in Respiratory and Non-Respiratory Disesases," Sec. Pulmonary Medicine. (2018) 5: 1-37.
Wong, W. et al., "FungalmelaninstimulatessurfactantproteinD-mediated opsonization of and host immune response to Aspergillus fumigatus spores," J. Biol. Chem. (2018) 293(13): 4901-4912.
Nousheen, L., et. al., "Molecular Docking and Mutational Studies of Human Surfactant Protein-D," World J. Pharm. Res. (2014) 3(7): 1140-1147.
Sim, R. "SP-D," The Complete FactsBook. (2000): 46-50.
Uniprot, Commercially available sequence for recombinant human SP-D. retrieved from https://www.uniprot.org/uniprotkb/P35247/entry#sequences on Oct. 10, 2023.

(56) References Cited

OTHER PUBLICATIONS

Watson, A. S. "Recombinant Expression of Functional Trimeric Fragments of Human SP-A and SP-D," University of Southampton, Faculty of Medicine, PhD Thesis (2016).

Brown-Augsburger, P. et al. "Site-directed Mutagenesis of Cys-15 and Cys-20 of Pulmonary Surfactant Protein D". The Journal of Biological Chemistry, vol. 271 No. 23, Jun. 7, 1996, pp. 13724-13730.

Zhang, P. et al. "The Amino-terminal Heptad Repeats of the Coiled-coil Neck Domain of Pulmonary Surfactant Protein D Are Necessary for the Assembly of Trimeric Subunits and Dodecamers". The Journal of Biological Chemistry, vol. 276 No. 23, Jun. 8, 2001, pp. 19862-19870.

* cited by examiner

METHODS AND COMPOSITIONS COMPRISING SURFACTANT PROTEIN D (SP-D)

CROSS-REFERENCE TO RELATED APPLICATIONS

This application is the U.S. National Phase of PCT/US2019/024305 filed Mar. 27, 2019 which published in English as WO 2019/191247 on Oct. 3, 2019 which claims priority to U.S. Prov. App. No. 62/650,142 filed Mar. 29, 2018 entitled "METHODS AND COMPOSITIONS COMPRISING SURFACTANT PROTEIN D (SP-D)" which are each incorporated by reference herein in their entirety.

REFERENCE TO SEQUENCE LISTING

The present application is being filed along with a Sequence Listing in electronic format. The Sequence Listing is provided as a file entitled 000280.001115 Replacement Sequence Listing, created on Feb. 23, 2023, which is approximately 7 Kb in size. The information in the electronic format of the Sequence Listing is incorporated herein by reference in its entirety.

FIELD OF THE INVENTION

Some embodiments provided herein relate to methods and pharmaceutical compositions comprising recombinant human surfactant protein D (SP-D) or active fragments thereof. Some such embodiments include solutions, and lyophilized solid forms of recombinant human surfactant protein D or active fragments thereof.

BACKGROUND OF THE INVENTION

Mammalian pulmonary surfactant is a mixture of proteins (10%) and lipids (90%) including the major lipid component dipalmitoylphosphatidylcholine (Zuo Y Y, et al., Biochim Biophys Acta (2008) 1778:1947-77). The main function of the pulmonary surfactant is to ensure minimal surface tension within the lung to avoid collapse during respiration. Furthermore, by interacting with inhaled pathogens, the pulmonary surfactant also participates in host defense (Clements J A. Am Rev Respir Dis (1977) 115:67-71). Pulmonary surfactant deficiency is associated with pulmonary diseases such as asthma, bronchiolitis, respiratory distress syndrome (RDS), cystic fibrosis, and pneumonia (Griese M. Eur Respir J (1999) 13:1455-76). Surfactant formulations are indicated for the treatment of RDS, which affects ~1.5 million premature babies globally every year. Respiratory distress syndrome is a major pulmonary surfactant deficiency disease caused by the structural immaturity of the lungs in premature infants, which makes it difficult to breathe, inhibits gas exchange, and promotes alveolar collapse (Notter R H. 2000 Lung Surfactants. Basic Science and Clinical Applications. New York, NY: Marcel Dekker Inc.). Successful treatment of complex pulmonary diseases typically requires the production of surfactant formulations whose composition matches natural pulmonary surfactant as closely as possible (Robertson B, et al., Biochim Biophys Acta (1998) 1408:346-61).

Pulmonary surfactant contains four different surfactant proteins. The two hydrophobic proteins, surfactant proteins B and C, are involved in the reduction of surface tension at the air-water interface, while the two hydrophilic proteins, surfactant proteins A and D, are members of the collectin family and are involved in the modulation of the host immune response and in surfactant pool recycling (Awasthi S. (2010) Recent Patents on Anti-Infective Drug Discovery, 5:115-123). Surfactant protein D (SP-D) is a C-type ($Ca^{2+}$-dependent) lectin that comprises four domains: a cysteine-linked N-terminal region required for the formation of intermolecular disulfide bonds, a triple-helical collagen region, an α-helical-coiled-coil trimerizing neck peptide, and a C-terminal calcium-dependent carbohydrate-recognition domain (CRD) (Crouch E. et al. (1994) J Biol Chem 269:17311-9). Monomers form trimers through folding of the collagenous region into triple helices and the assembly of a coiled-coil bundle of α-helices in the neck region. These trimers are stabilized by two disulfide bonds in the cysteine-rich N-terminal domain. The SP-D trimer has a total molecular weight of 129 kDa which comprises three identical 43-kDa polypeptide chains. SP-D trimers can form higher order oligomerization states which vary by size and conformation. Higher order oligomerization states may be important for SP-D function (Hakansson K, et al., Protein Sci (2000) 9:1607-17; Crouch E. Respir Res (2000) 1:93-108; Crouch E. et al. (2006) J Biol Chem 281:18008-14).

In contrast to the other surfactant proteins, SP-D is not involved in reduction of surface tension at the air-water interface, and does not alter the biophysical properties of pulmonary surfactant (Awasthi S. (2010) Recent Patents on Anti-Infective Drug Discovery, 5:115-123). SP-D has a role in the pulmonary innate immune system by providing anti-inflammatory and antimicrobial activities that address chronic pulmonary diseases such as asthma, cystic fibrosis, and smoking-induced emphysema (Clark H, et al., Immunobiology (2002) 205:619-31). SP-D also has a critical role in regulating surfactant pool homeostasis, and absence of SP-D during development results in an emphysema phenotype (Wert, S. et al. (2000) Chest 117: 248S; Korfhagen, T. R. et al. (1998) J Biol Chem 273:28438-28443). Data based on premature newborn lambs suggest that the administration of ~2-3 mg/kg of recombinant human SP-D (rhSP-D) in combination with 100 mg/kg Survanta® (a natural surfactant available in USA) is more effective than Survanta® alone for the prevention of endotoxin shock and the reduction of lung inflammation caused by ventilation (Ikegami M, et al., Am J Respir Crit Care Med (2006) 173:1342-7; Sato A, et al., Am J Respir Crit Care Med (2010) 181:1098-105).

Traditionally, SP-D has been isolated from the supernatant of bronchoalveolar lavage or amniotic fluid, but most, if not all, of SP-D is lost during purification of commercial surfactant, in part due to the hydrophilic properties of SP-D (Dodagatta-Marri E, et al., Methods Mol Biol (2014) 100: 273-90). The use of rhSP-D to supplement pulmonary surfactant formulations can ensure therapeutic efficacy because current pulmonary surfactant formulations lack the ability to effectively modulate the host immune response in the absence of the hydrophilic surfactant proteins. An important characteristic of native SP-D that must be maintained in any pharmaceutical composition is the appropriate oligomerization state because the higher-order multimerization in the endogenous surfactant protein increases the number of SP-D-binding sites to carbohydrate ligands on the surface of pathogens, achieving potent bacterial and viral agglutination effects (White M, et al., J Immunol (2008) 181:7936-43). The appropriate oligomerization state is also required for receptor recognition and receptor-mediated signal transduction for modulation of the host immune response (Yamoze M et al., J Biol Chem (2008) 283:35878-35888) as well as for maintenance of surfactant homeostasis (Zhang L et al., J Biol Chem (2001) 276:19214-19219).

SUMMARY OF THE INVENTION

Some embodiments include a pharmaceutical composition comprising recombinant human surfactant protein D (rhSP-D) or an active fragment thereof. Some embodiments also include a buffer, a sugar, and a calcium salt.

In some embodiments, the buffer is selected from the group consisting of acetate, citrate, glutamate, histidine, succinate, and phosphate. In some embodiments, the buffer is histidine. In some embodiments, the concentration of the histidine is from about 0.1 mM to about 100 mM. In some embodiments, the concentration of the histidine is about 5 mM.

In some embodiments, the sugar is selected from the group consisting of sucrose, maltose, lactose, glucose, fructose, galactose, mannose, arabinose, xylose, ribose, rhamnose, trehalose, sorbose, melezitose, raffinose, thioglucose, thiomannose, thiofructose, octa-O-acetyl-thiotrehalose, thiosucrose, and thiomaltose. In some embodiments, the sugar is lactose. In some embodiments, the concentration of the lactose is from 1 mM to 500 mM. In some embodiments, the concentration of the lactose is about 265 mM.

In some embodiments, the calcium salt is selected from the group consisting calcium chloride, calcium bromide, calcium acetate, calcium sulfate, and calcium citrate. In some embodiments, the calcium salt is calcium chloride. In some embodiments, the concentration of the calcium chloride is from about 0.1 mM to about 10 mM. In some embodiments, the concentration of the calcium chloride is about 5 mM.

In some embodiments, the pharmaceutical composition has a pH from about 5.0 to about 9.0. In some embodiments, the pharmaceutical composition has a pH from about 5.5 to about 6.5. In some embodiments, the pharmaceutical composition has a pH about 6.0.

In some embodiments, the concentration of the rhSP-D is from about 0.1 mg/ml to about 10 mg/ml. In some embodiments, the concentration of the rhSP-D is from about 1 mg/ml to about 4 mg/ml. In some embodiments, the concentration of the rhSP-D is about 2 mg/ml. In some embodiments, the concentration of the rhSP-D is about 4 mg/ml.

Some embodiments include a pharmaceutical composition comprising a population of rhSP-D polypeptides having oligomeric forms, wherein greater than 30% of the oligomeric forms comprise dodecamers of rhSP-D. In some embodiments, greater than 40% of the oligomeric forms comprise dodecamers of the rhSP-D. In some embodiments, less than 15% of the oligomeric forms comprise aggregates of the rhSP-D, wherein the aggregates have a radius greater than 70 nm. In some embodiments, less than 10% of the oligomeric forms comprise aggregates of the rhSP-D, wherein the aggregates have a radius greater than 70 nm. In some embodiments, less than 5% of the oligomeric forms comprise aggregates of the rhSP-D, wherein the aggregates have a radius greater than 70 nm.

Some embodiments also include a bulking agent. In some embodiments, the bulking agent is selected from the group consisting of mannitol, xylitol, sorbitol, maltitol, lactitol, glycerol, erythritol, arabitol, glycine, alanine, threonine, valine, and phenylalanine.

In some embodiments, the composition lacks a chelating agent selected from EDTA and EGTA.

In some embodiments, the rhSP-D polypeptide comprises the amino acid sequence of SEQ ID NO:02, or an active fragment thereof. In some embodiments, the rhSP-D or active fragment thereof comprises a residue at a polymorphic position corresponding to a residue selected from the group consisting of Met11, Thr160, Ser 270, and Ala 286.

Some embodiments include a pharmaceutical composition comprising 2 mg/ml rhSP-D, 5 mM histidine, 265 mM lactose, 5 mM calcium chloride, wherein the solution has a pH of 6.0. Some embodiments include a pharmaceutical composition comprising 2 mg/ml rhSP-D, 5 mM Histidine, 265 mM Lactose, 1 mM calcium chloride, wherein the solution has a pH 6.0. Some embodiments include a pharmaceutical composition comprising 1 mg/ml rhSP-D, 5 mM Histidine, 265 mM Lactose, 5 mM calcium chloride, wherein the solution has a pH 6.0. Some embodiments include a pharmaceutical composition comprising 4 mg/ml rhSP-D, 5 mM Histidine, 265 mM Lactose, 5 mM calcium chloride, wherein the solution has a pH 6.0.

Some embodiments include a lyophile of the pharmaceutical composition of any one of the foregoing pharmaceutical compositions.

Some embodiments include an article comprising a container comprising a lyophile of the pharmaceutical composition of any one of the foregoing pharmaceutical compositions.

Some embodiments include a method of preparing a lyophile comprising lyophilizing the pharmaceutical composition of any one of the foregoing pharmaceutical compositions.

Some embodiments include a method of preparing a pharmaceutical composition comprising contacting a lyophile of the pharmaceutical compositions described herein with a pharmaceutically acceptable diluent to form a solution or suspension of the rhSP-D or active fragment thereof.

In some embodiments, the diluent is suitable for administration to a lung. In some embodiments, the diluent is sterile water.

In some embodiments, the solution or suspension has a concentration of the rhSP-D or active fragment thereof from about 0.1 mg/ml to about 10 mg/ml. In some embodiments, the solution or suspension has a concentration of the rhSP-D or active fragment thereof from about 1 mg/ml to about 4 mg/ml. In some embodiments, the solution or suspension has a concentration of the rhSP-D or active fragment thereof of about 2 mg/ml. In some embodiments, the solution or suspension has a concentration of the rhSP-D or active fragment thereof of about 4 mg/ml.

In some embodiments, less than about 3% of the rhSP-D oligomeric species by mass in the solution or suspension is in a high molecular weight oligomeric form with a radius greater than 70 nm.°

In some embodiments, the solution or suspension comprises a population of rhSP-D polypeptides having oligomeric forms, wherein greater than 30% of the oligomeric forms comprise dodecamers of the rhSP-D. In some embodiments, greater than 40% of the oligomeric forms comprise dodecamers of the rhSP-D. In some embodiments, greater than 45% of the oligomeric forms comprise dodecamers of the rhSP-D.

In some embodiments, less than 10% of the oligomeric forms comprise aggregates of the rhSP-D, wherein the aggregates have a radius greater than 70 nm. In some embodiments, less than 5% of the oligomeric forms comprise aggregates of the rhSP-D, wherein the aggregates have a radius greater than 70 nm. In some embodiments, less than 3% of the oligomeric forms comprise aggregates of the rhSP-D, wherein the aggregates have a radius greater than 70 nm.

DETAILED DESCRIPTION

Figure 1:
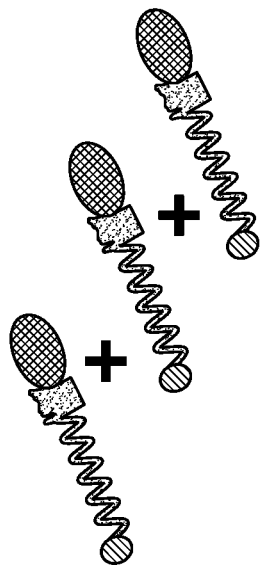
FIG. 1 is a schematic which depicts the formation of an SP-D trimer, and structural features of the SP-D trimer.
Figure 1:
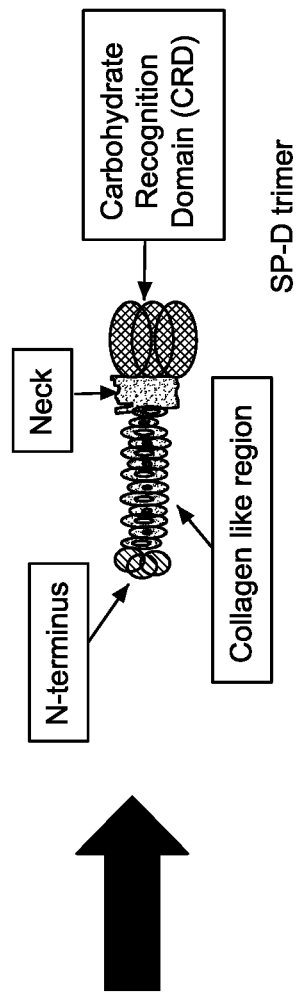

Surfactant protein D (SP-D) is a C-type ($Ca^{2+}$-dependent) lectin that comprises four domains: a cysteine-linked N-terminal region required for the formation of intermolecular disulfide bonds, a triple-helical collagen region, an α-helical-coiled-coil trimerizing neck peptide, and a C-terminal calcium-dependent carbohydrate-recognition domain (CRD) (Crouch E. et al. (1994) J Biol Chem 269:17311-9). Monomers form trimers through folding of the collagenous region into triple helices and the assembly of a coiled-coil bundle of α-helices in the neck region (FIG. 1). These trimers are stabilized by two disulfide bonds in the cysteine-rich N-terminal domain. The SP-D trimer has a total molecular weight of 129 kDa which comprises three identical 43-kDa polypeptide chains. SP-D trimers can form higher oligomerization states which vary by size and conformation. Higher oligomerization states may be important for SP-D function (Hakansson K, et al., Protein Sci (2000) 9:1607-17; Crouch E. Respir Res (2000) 1:93-108; Crouch E. et al. (2006) J Biol Chem 281:18008-14). The association of SP-D trimers into higher oligomerization states is sensitive to environmental factors and conditions during purification and storage. The pathway and type of interactions involved in the formation of large oligomers of SP-D have not been previously elucidated.

Recombinant human SP-D (rhSP-D) has been produced in various mammalian systems including certain human myeloid leukemia cell lines, and Chinese hamster ovary (CHO) cells. A sample of rhSP-D can include a diverse population of different rhSP-D oligomeric forms including: trimers, hexamers, dodecamers, multimers of hexamers and dodecamers having a star-like appearance, and even larger oligomeric species identified as aggregates. The rhSP-D derived from various mammalian systems can be substantially different. For example, post-translational modifications of rhSP-D can affect the distribution of rhSP-D oligomeric forms within a given sample of the rhSP-D. In addition, rhSP-D produced in certain human myeloid leukemia cell lines can have a higher amount of rhSP-D dodecamers and a lower amount of larger oligomeric species, such as rhSP-D aggregates, compared to rhSP-D produced from CHO cells.

Applicant has discovered certain formulations of rhSP-D and active fragments thereof that provide improved shelf-life, improved stability of active rhSP-D protein, and improved stability for certain rhSP-D oligomeric forms. Some embodiments of such formulations include compositions comprising rhSP-D for administration, rhSP-D for lyophilization, lyophilized rhSP-D, reconstituted lyophilized rhSP-D, and reconstituted lyophilized rhSP-D for administration. In some embodiments, compositions are suitable for pulmonary administration, such as administration to a lung, such as a neonate lung.

Pharmaceutical Compositions

Some embodiments of the compositions and methods provided herein include pharmaceutical compositions of recombinant human surfactant protein D (rhSP-D) or an active fragment thereof. In some embodiments, rhSP-D or an active fragment thereof has activity in a bacterial aggregation assay, or in a TLR4 inhibition assay. In some embodiments, the pharmaceutical composition can be an aqueous solution, a suspension, or a solid form. In some embodiments, the pharmaceutical composition of rhSP-D or an active fragment thereof is suitable for lyophilization to a solid form. In some embodiments, a solid form, such as a lyophile or powder, can be administered to a lung, and/or can be reconstituted to form a certain solution suitable for administration to a lung. In some embodiments, the pharmaceutical composition comprising the aqueous solution or suspension of rhSP-D or an active fragment thereof is suitable for administration to a lung.

Certain activities of rhSP-D, or a fragment thereof, can be readily determined using bacterial aggregation assays, Toll-like receptor 4 (TLR4) inhibition assays, and/or an asymmetric flow field-flow fractionation with multi-angle laser light scattering (AF4-MALLS) analysis. In some embodiments, the activity of rhSP-D, or an active fragment thereof, can include a biological activity, such as activity measured in a bacterial aggregation assays, or a TLR4 inhibition assay. In some embodiments, the activity of rhSP-D, or an active fragment thereof, can include the activity of a population of the rhSP-D, or active fragments thereof, to form certain oligomeric forms of the rhSP-D and/or to form a certain distribution of oligomeric forms of the rhSP-D. Example methods to identify the distribution of oligomeric forms of rhSP-D in a sample are provided herein.

SP-D comprises four domains: a cysteine-linked N-terminal region required for the formation of intermolecular disulfide bonds, a triple-helical collagen region, an α-helical-coiled-coil trimerizing neck peptide, and a C-terminal calcium-dependent carbohydrate-recognition domain (CRD). Example rhSP-D polypeptide sequences are provided in TABLE 1. Certain portions of the SP-D can have certain roles in the function of SP-D in vivo. For example, in SP-D knock-out mice, a recombinant fragment of human SP-D consisting of a shorter collagen region (but not the entire collagen region or the amino terminus of wild-type SP-D), the neck domain, and the CRD, inhibits certain aspects of the development of emphysema-like pathology (Knudsen L., et al., (2009) The Anatomical Record 292: 183-189 which is incorporated herein by reference in its entirety). The cysteine-linked N-terminal region may have activity in formation of oligomeric forms of SP-D. For example, a nucleotide change from A to C resulting in a Met to Thr substitution at position 11 in the protein (Met(11)Thr) can influence formation of oligomeric forms of SP-D. See e.g., Knudsen L., et al., (2013) J. Anat 223:581-592; and Winkler C., et al., (2014) Exp Lung Res 40:154-163 each of which is incorporated herein by reference in its entirety. Deletion studies with a mutant rat SP-D protein lacking the rat triple-helical collagen region demonstrated that the mutant rat SP-D could still form trimers, but was unable to form higher order oligomers such as dodecamers, and lacked activity in for the regulation of pulmonary macrophage activation, airspace remodeling, and surfactant lipid homeostasis. See Ogasawara Y. et al., (1995) J Biol Chem 270: 19052-19058; and Kingma P. S., et al., (2006) J Biol Chem 281:24496-24505 which are each incorporated herein by reference in its entirety. Further deletion studies with a rat SP-D protein demonstrated that the rat cysteine-linked N-terminal region had a role in efficient viral neutralization and opsonization. See White M. et al., (2008) J. Immunol 181:7937-7942 which is incorporated herein by reference in its entirety. Examples of human SP-D lacking certain domains are disclosed in U.S. Pat. No. 8,865,643 which is incorporated by reference in its entirety.

In some embodiments, the pharmaceutical composition can include a buffer. Examples of buffers include acetate, citrate, glutamate, histidine, succinate, and phosphate. In some embodiments, the buffer is histidine. In some embodiments, the concentration of the buffer, such as histidine, is 0.1 mM, 1 mM, 2 mM, 3 mM, 4 mM, 5 mM, 6 mM, 7 mM, 8 mM, 9 mM, 10 mM, 20 mM, 30 mM, 40 mM, 50 mM, 60 mM, 70 mM, 80 mM, 90 mM, 100 mM, or a concentration in a range between any two of the foregoing concentrations. In some embodiments, the concentration of the buffer, such as histidine, is about 0.1 mM, about 1 mM, about 2 mM, about 3 mM, 4 mM, about 5 mM, about 6 mM, about 7 mM, about 8 mM, about 9 mM, about 10 mM, about 20 mM, about 30 mM, about 40 mM, about 50 mM, about 60 mM, about 70 mM, about 80 mM, about 90 mM, about 100 mM, or a concentration in a range between any two of the foregoing concentrations.

In some embodiments, the pharmaceutical composition can include a sugar. Examples of sugars include trehalose, sucrose, maltose, lactose, glucose, fructose, galactose, mannose, arabinose, xylose, ribose, rhamnose, trehalose, sorbose, melezitose, raffinose, thioglucose, thiomannose, thiofructose, octa-O-acetyl-thiotrehalose, thiosucrose, and thiomaltose. In some embodiments, the sugar is lactose. In some embodiments, the concentration of the sugar, such as lactose, is 0.1 mM, 1 mM, 10 mM, 20 mM, 30 mM, 40 mM, 50 mM, 100 mM, 150 mM, 200 mM, 250 mM, 265 mM, 300 mM, 350 mM, 400 mM 450 mM, 500 mM, 600 mM, 700 mM, 800 mM, 900 mM, 1000 mM, or a concentration in a range between any two of the foregoing concentrations. In some embodiments, the concentration of the sugar, such as lactose, is about 0.1 mM, about 1 mM, about 10 mM, about 20 mM, about 30 mM, about 40 mM, about 50 mM, about 100 mM, about 150 mM, about 200 mM, about 250 mM, about 265 mM, about 300 mM, about 350 mM, about 400 mM about 450 mM, about 500 mM, about 600 mM, about 700 mM, about 800 mM, about 900 mM, about 1000 mM, or a concentration in a range between any two of the foregoing concentrations.

In some embodiments, the pharmaceutical composition can include a calcium salt. Examples of calcium salts include calcium chloride, calcium bromide, calcium acetate, calcium sulfate, and calcium citrate. In some embodiments, the calcium salt is calcium chloride. In some embodiments, the concentration of the calcium salt, such as calcium chloride, is 0.1 mM, 1 mM, 2 mM, 3 mM, 4 mM, 5 mM, 6 mM, 7 mM, 8 mM, 9 mM, 10 mM, 20 mM, 30 mM, 40 mM, 50 mM, 60 mM, 70 mM, 80 mM, 90 mM, 100 mM, or a concentration in a range between any two of the foregoing concentrations. In some embodiments, the concentration of the calcium salt, such as calcium chloride, is about 0.1 mM, about 1 mM, about 2 mM, about 3 mM, 4 mM, about 5 mM, about 6 mM, about 7 mM, about 8 mM, about 9 mM, about 10 mM, about 20 mM, about 30 mM, about 40 mM, about 50 mM, about 60 mM, about 70 mM, about 80 mM, about 90 mM, about 100 mM, or a concentration in a range between any two of the foregoing concentrations.

In some embodiments, the pharmaceutical composition can include an inorganic salt or organic salt. Examples of inorganic salts include sodium chloride, potassium chloride, calcium chloride, sodium phosphate, potassium phosphate, and sodium hydrogen carbonate. Examples of organic salts include sodium citrate, potassium citrate and sodium acetate. In some embodiments, the inorganic salt is sodium chloride. In some embodiments, the concentration of the inorganic salt or organic salt, such as sodium chloride, is 0.1 mM, 1 mM, 2 mM, 3 mM, 4 mM, 5 mM, 6 mM, 7 mM, 8 mM, 9 mM, 10 mM, 20 mM, 30 mM, 40 mM, 50 mM, 60 mM, 70 mM, 80 mM, 90 mM, 100 mM, or a concentration in a range between any two of the foregoing concentrations. In some embodiments, the concentration of the inorganic salt or organic salt, such as sodium chloride, is about 0.1 mM, about 1 mM, about 2 mM, about 3 mM, 4 mM, about 5 mM, about 6 mM, about 7 mM, about 8 mM, about 9 mM, about 10 mM, about 20 mM, about 30 mM, about 40 mM, about 50 mM, about 60 mM, about 70 mM, about 80 mM, about 90 mM, about 100 mM, or a concentration in a range between any two of the foregoing concentrations. In some embodiments, the pharmaceutical composition can lack an inorganic salt or organic salt, such as sodium chloride.

In some embodiments, the pharmaceutical composition can include a surface-active agent. Examples of surface-active agents include hexadecanol, tyloxapol, dipalmitoylphosphatidylcholine (DPPC), PG, palmitoyl-oleoyl phosphatidylglycerol, palmitic acid, tripalmitin, polysorbates such as polysorbate-20, polysorbate-80, polysorbate-21, polysorbate-40, polysorbate-60, polysorbate-65, polysorbate-81, and polysorbate-85. More examples of surface active agents include poloxamer such as poloxamer 188, Triton such as Triton X-100, sodium dodecyl sulfate (SDS), sodium laurel sulfate, sodium octyl glycoside, lauryl-sulfobetaine, myristyl-sulfobetaine, linoleyl-sulfobetaine, stearyl-sulfobetaine, lauryl-sarcosine, myristyl-sarcosine, linoleyl-sarcosine, stearyl-sarcosine, linoleyl-betaine, myristyl-betaine, cetyl-betaine, lauroamidopropyl-betaine, cocamidopropyl-, linoleamidopropyl-betaine, myristamidopropyl-betaine, palmidopropyl-betaine, isostearamidopropyl-betaine, myristamidopropyl-dimethylamine, palmidopropyl-dimethylamine, isostearamidopropyl-dimethylamine, sodium methyl cocoyl-taurate, disodium methyl oleyl-taurate, polyethyl glycol, polypropyl glycol, and copolymers of ethylene and propylene glycol. In some embodiments, the surface-active agent is tyloxapol. In some embodiments, the concentration of the surface-active agent, such as tyloxapol, is 0.0001%, 0.0005%, 0.001%, 0.005%, 0.01%, 0.05%, 0.1%, 0.5%, 1%, (v/v) or a concentration in a range between any two of the foregoing concentrations. In some embodiments, the concentration of the surface-active agent, such as tyloxapol, is about 0.0001%, about 0.0005%, about 0.001%, about 0.005%, about 0.01%, about 0.05%, about 0.1%, about 0.5%, about 1%, (v/v) or a concentration in a range between any two of the foregoing concentrations.

In some embodiments, the pharmaceutical composition can lack a surface-active agent, such as tyloxapol.

In some embodiments, the pharmaceutical composition can have a pH of 4.0, 4.5, 5.0, 5.5, 6.0, 6.5, 7.0, 7.5, 8.0, 8.5, 9.0, 9.5, 10.0, or a pH in a range between any two of the foregoing values. In some embodiments, the pharmaceutical composition can have a pH of about 4.0, about 4.5, about 5.0, about 5.5, about 6.0, about 6.5, about 7.0, about 7.5, about 8.0, about 8.5, about 9.0, about 9.5, about 10.0, or a pH in a range between any two of the foregoing values.

In some embodiments, the concentration of protein, such as rhSP-D or an active fragment thereof, in the pharmaceutical composition can be 0.01 mg/ml, 0.05 mg/ml, 0.1 mg/ml, 0.5 mg/ml, 1 mg/ml, 2 mg/ml, 3 mg/ml, 4 mg/ml, 5 mg/ml, 6 mg/ml, 7 mg/ml, 8 mg/ml, 9 mg/ml, 10 mg/ml, 20 mg/ml, 30 mg/ml, 40 mg/ml, 50 mg/ml, 60 mg/ml, 70 mg/ml, 80 mg/ml, 90 mg/ml, 100 mg/ml, or a concentration in a range between any two of the foregoing concentrations. In some embodiments, the concentration of protein, such as rhSP-D or an active fragment thereof, in the pharmaceutical composition can be about 0.01 mg/ml, about 0.05 mg/ml, about 0.1 mg/ml, about 0.5 mg/ml, about 1 mg/ml, about 2 mg/ml, about 3 mg/ml, about 4 mg/ml, about 5 mg/ml, about 6 mg/ml, about 7 mg/ml, about 8 mg/ml, about 9 mg/ml, about 10 mg/ml, about 20 mg/ml, about 30 mg/ml, about 40 mg/ml, about 50 mg/ml, about 60 mg/ml, about 70 mg/ml, about 80 mg/ml, about 90 mg/ml, about 100 mg/ml, or a concentration in a range between any two of the foregoing concentrations.

In some embodiments, the pharmaceutical composition can include a bulking agent. Examples of bulking agents include a sugar disclosed herein. More examples of bulking agents include mannitol, xylitol, sorbitol, maltitol, lactitol, glycerol, erythritol, arabitol, glycerine, glycine, alanine, threonine, valine, and phenylalanine. In some embodiments, the concentration of the bulking agent, is 0.1 mM, 1 mM, 2 mM, 3 mM, 4 mM, 5 mM, 6 mM, 7 mM, 8 mM, 9 mM, 10 mM, 20 mM, 30 mM, 40 mM, 50 mM, 60 mM, 70 mM, 80 mM, 90 mM, 100 mM, or a concentration in a range between any two of the foregoing concentrations. In some embodiments, the concentration of the bulking agent, is about 0.1 mM, about 1 mM, about 2 mM, about 3 mM, 4 mM, about 5 mM, about 6 mM, about 7 mM, about 8 mM, about 9 mM, about 10 mM, about 20 mM, about 30 mM, about 40 mM, about 50 mM, about 60 mM, about 70 mM, about 80 mM, about 90 mM, about 100 mM, or a concentration in a range between any two of the foregoing concentrations.

In some embodiments, the pharmaceutical composition can include a chelating agent. In some embodiments, the pharmaceutical composition can lack a chelating agent. Examples of chelating agents include EDTA, and EGTA.

In some embodiments, the rhSP-D comprises a wild-type human SP-D polypeptide. In some embodiments, the rhSP-D includes a polymorphism of the human SP-D polypeptide. Example SP-D polypeptide sequences are provided in TABLE 1. Polymorphisms in the human SP-D polypeptide can include: residue 11, ATG (Met)→ACG (Thr); residue 25, AGT (Ser)→AGC (Ser); residue 160, ACA (Thr)→GCA (Ala); residue 270, TCT (Ser)→ACT (Thr); and residue 286, GCT (Ala)→GCC (Ala) in which the positions relate to a position in a mature SP-D polypeptide, such as the example polypeptide of SEQ ID NO:02. In some embodiments, the rhSP-D comprises a certain residue at a polymorphic position in which the residue selected from Met11/31, Thr160/180, Ser 270/290, and Ala 286/306 in which residue positions relate to a position in the mature SP-D polypeptide, such as example SEQ ID NO: 02, and a position in the SP-D polypeptide with its leader polypeptide, such as example SEQ ID NO:01. In some embodiments, the rhSP-D comprises Met11/31. In some embodiments, the rhSP-D comprises Met11/31, Thr160/180, Ser 270/290, and Ala 286/306. In some embodiments, the rhSP-D polypeptide has an identity with a polypeptide of SEQ ID NO: 02 over the entire length of the polynucleotide of at least 80%, 90%, 95%, 99% and 100%, or any percentage in a range between any of the foregoing percentages.

TABLE 1

| SEQ ID NO. | Sequence |
| --- | --- |
| SEQ ID NO: 01<br>SP-D polypeptide including a leader sequence (underlined) and polymorphisms (underlined) at: Met 31, Thr 180, Ser 290, Ala 306. | MLLFLLSALVLLTQPLLGYLEAEMKTYSHRTMPSACTLV<br>MCSSVESGLPGRDGRDGREGPRGEKGDPGLPGAAGQAG<br>MPGQAGPVGPKGDNGSVGEPGPKGDTGPSGPPGPPGVPG<br>PAGREGPLGKQGNIGPQGKPGPKGEAGPKGEVGAPGMQG<br>SAGARGLAGPKGERGVPGERGVPGNTGAAGSAGAMGPQ<br>GSPGARGPPGLKGDKGIPGDKGAKGESGLPDVASLRQQV<br>EALQGQVQHLQAAFSQYKKVELFPNGQSVGEKIFKTAGF<br>VKPFTEAQLLCTQAGGQLASPRSAAENAALQQLVVAKNE<br>AAFLSMTDSKTEGKFTYPTGESLVYSNWAPGEPNDDGGS<br>EDCVEIFTNGKWNDRACGEKRLVVCEF |
| SEQ ID NO: 02<br>SP-D polypeptide of SEQ ID NO: 01, without leader sequence, and polymorphisms (underlined) at: Met 11, Thr 160, Ser 270, Ala 286. | AEMKTYSHRTMPSACTLVMCSSVESGLPGRDGRDGREGP<br>RGEKGDPGLPGAAGQAGMPGQAGPVGPKGDNGSVGEPG<br>PKGDTGPSGPPGPPGVPGPAGREGPLGKQGNIGPQGKPGP<br>KGEAGPKGEVGAPGMQGSAGARGLAGPKGERGVPGERG<br>VPGNTGAAGSAGAMGPQGSPGARGPPGLKGDKGIPGDKG<br>AKGESGLPDVASLRQQVEALQGQVQHLQAAFSQYKKVEL<br>FPNGQSVGEKIFKTAGFVKPFTEAQLLCTQAGGQLASPRS<br>AAENAALQQLVVAKNEAAFLSMTDSKTEGKFTYPTGESL<br>VYSNWAPGEPNDDGGSEDCVEIFTNGKWNDRACGEKRL<br>VVCEF |

In some embodiments, the rhSP-D is derived from a human myeloid leukemia cell line expressing the rhSP-D from an integrated transgene. Example expression vectors, rhSP-D polypeptides, cell-lines, and methods of purifying rhSP-D from such cells, are provided in U.S 2019/0071693 and U.S. 2019/0071694 each of which is expressly incorporated by reference herein in its entirety.

In some embodiments, a pharmaceutical composition, such as a solution or suspension, comprising a population of rhSP-D polypeptides can have a certain distribution of oligomeric forms of the rhSP-D. A composition of rhSP-D can include different rhSP-D oligomeric forms including: trimers with a mass of about 130-150 kDa on SDS-PAGE which include 3 monomers and which together can have a rod-like appearance as visualized by atomic force microscopy (AFM); hexamers with a mass of about 250 kDa on SDS-PAGE which include 6 monomers; dodecamers with a predicted mass of about 520 kDa, as measured by AF4-MALLS and which include 12 monomers and can have an X-like appearance as visualized by AFM; larger heterogeneous oligomeric species which comprise multiples of more than four trimers and can have a star-like- or star-shaped appearance with a radius of about 70 nm as visualized and identified by AFM, such oligomers are known as star-like oligomers; and even larger oligomeric species having a radius larger than 70 nm as visualized by AFM and measured by AF4-MALLS and known as aggregates.

In some embodiments, more than about 10%, 20%, 30%, 50%, 60%, 70%, 80%, 90%, or a percentage within a range between any two of the foregoing percentages, of the oligomeric forms of rhSP-D can be a dodecameric oligomeric form of rhSP-D as measured as a relative peak area (RPA) in an AF4-MALLS analysis. In some embodiments, more than about 10%, 20%, 30%, 50%, 60%, 70%, 80%, 90%, or a percentage within a range between any two of the foregoing percentages, of the mass of the oligomeric forms, such as in a solution or suspension, of rhSP-D can be a dodecameric oligomeric form of rhSP-D. In some embodiments, more than about 10%, 20%, 30%, 50%, 60%, 70%, 80%, 90%, or a percentage within a range between any two of the foregoing percentages, of the number of molecules of the oligomeric forms, such as in a solution or suspension, of rhSP-D can be a dodecameric oligomeric form of rhSP-D.

In some embodiments, less than about 0.5%, 1%, 2%, 3%, 4%, 5%, 10%, 20%, 30%, 50%, or a percentage within a range between any two of the foregoing percentages, of the oligomeric forms of rhSP-D can be an aggregate oligomeric form of rhSP-D as measured as an RPA or an adjusted RPA in an AF4-MALLS analysis. In some embodiments, less than about 0.5%, 1%, 2%, 3%, 4%, 5%, 10%, 20%, 30%, 50%, or a percentage within a range between any two of the foregoing percentages, of the mass of the oligomeric forms, such as in a solution or suspension, of rhSP-D can be an aggregate oligomeric form of rhSP-D. In some embodiments, less than about 0.5%, 1%, 2%, 3%, 4%, 5%, 10%, 20%, 30%, 50%, or a percentage within a range between any two of the foregoing percentages, of the number of molecules of the oligomeric forms, such as in a solution or suspension, of rhSP-D can be an aggregate oligomeric form of rhSP-D.

In some embodiments, a pharmaceutical composition consists of, consists essentially of, or comprises 1 mg/ml rhSP-D, 5 mM histidine, 265 mM lactose, 5 mM calcium chloride, having a pH of 6.0. In some embodiments, a pharmaceutical composition consists of, consists essentially of, or comprises 1 mg/ml rhSP-D, 5 mM histidine, 265 mM lactose, 1 mM calcium chloride, having a pH of 6.0. In some embodiments, a pharmaceutical composition consists of, consists essentially of, or comprises 2 mg/ml rhSP-D, 5 mM Histidine, 265 mM Lactose, 1 mM $CaCl_2$, pH 6.0. In some embodiments, a pharmaceutical composition consists of, consists essentially of, or comprises 2 mg/ml rhSP-D, 5 mM histidine, 265 mM lactose, 5 mM calcium chloride, having a pH of 6.0. In some embodiments, a pharmaceutical composition consists of, consists essentially of, or comprises 4 mg/ml rhSP-D, 5 mM histidine, 265 mM lactose, 5 mM calcium chloride, having a pH of 6.0.

In some embodiments, the pharmaceutical compositions provided herein can include an admixture with a suitable carrier, diluent, or excipient such as sterile water, physiological saline, glucose, or the like, and can contain auxiliary substances such as wetting or emulsifying agents, pH buffering agents, gelling or viscosity enhancing additives, preservatives, flavoring agents, colors, and the like, depending upon the route of administration and the preparation desired. See e.g., "Remington: The Science and Practice of Pharmacy", Lippincott Williams & Wilkins; 20th edition (Jun. 1, 2003) and "Remington's Pharmaceutical Sciences," Mack Pub. Co.; $18^{th}$ and $19^{th}$ editions (December 1985, and June 1990, respectively). In some embodiments, such preparations can include complexing agents, metal ions, polymeric compounds such as polyacetic acid, polyglycolic acid, hydrogels, dextran, and the like, liposomes, microemulsions, micelles, unilamellar or multilamellar vesicles, erythrocyte ghosts or spheroblasts. Suitable lipids for liposomal formulation include monoglycerides, diglycerides, sulfatides, lysolecithin, phospholipids, saponin, bile acids, and the like. The presence of such additional components can influence the physical state, solubility, stability, rate of in vivo release, and rate of in vivo clearance, and are thus can be chosen according to the intended application, such that the characteristics of the carrier are tailored to the selected route of administration, such as pulmonary delivery, such as delivery to a lung, such as delivery to a neonate lung.

In some embodiments, pharmaceutical compositions are suitable for intratracheal, intrabronchial or bronchoalveolar administration to a lung. In some embodiments, intratracheal, intrabronchial or bronchoalveolar administration can include spraying, lavage, inhalation, flushing or installation, using as fluid a physiologically acceptable composition in which the pharmaceutical composition has been dissolved. Methods of administration can include the use of continuous positive airway pressure (CPAP). Methods of administration can include direct intubation. In some embodiments, pharmaceutical compositions provided herein can be delivered to the lungs while inhaling. Example forms that can be delivered include dry powders, and aerosols. A wide range of mechanical devices designed for pulmonary delivery of therapeutic products can be employed, including but not limited to nebulizers, metered dose inhalers, and powder inhalers, all of which are familiar to those skilled in the art. These devices employ formulations suitable for the dispensing of a pharmaceutical composition. Typically, each formulation is specific to the type of device employed and can involve the use of an appropriate propellant material, in addition to diluents, adjuvants, and/or carriers useful in therapy.

Identification of Oligomeric Species of rhSP-D

The distribution of oligomeric forms of rhSP-D, such as the distribution of oligomeric forms of rhSP-D in a solution or suspension, can be determined by a variety of techniques. In some embodiments, a method for identifying oligomeric species of rhSP-D can include performing atomic force microscopy (AFM) on a sample of rhSP-D, identifying and quantifying oligomeric species of rhSP-D in the AFM images. See e.g., Arroyo R, et al. (2017) Biophys J 112 (3): 503a which is incorporated by reference herein in its entirety. In an example embodiment, a sample of rhSP-D can be diluted in a buffer, such as a dilution buffer (200 mM NaCl, 20 mM Tris (pH 7.4), 1 mM EDTA) and placed on freshly cleaved mica substrate. Samples can be imaged with an atomic force microscope, such as a microscope from Nanotec (Nanotec Electrónica, Madrid, Spain) and PointProbePlus tips, type PPP-NCH (Nanosensors, Neuchâtel, Switzerland). Raw images can be subjected to general plane subtraction, flattening with background subtraction and artifact line removal. Oligomeric species that can be identified in the obtained images can include trimers, hexamers, dodecamers, and star-like oligomers. Trimers can have a rod-like appearance, and some trimers can have an average length of about 65 nm (±8.6 nm). Dodecamers can have an X-shaped appearance, and some dodecamers can have a tip to opposite tip length of about 136 nm (±8.1 nm). The star-like oligomeric species can include members that have a star-like- or star-shaped appearance composed of 6-20 trimers, in which each trimer is joined to a particular member of this species through a central hub. Some star-like oligomers can have a diameter of about 140 nm, similar to the diameter of the measured dodecamers.

In some embodiments, a method for identifying oligomeric species of rhSP-D can include performing an asymmetric flow field-flow fractionation with multi-angle laser light scattering (AF4-MALLS) analysis on a sample of rhSP-D. AF4-MALLS can provide a fractogram that includes a first peak (Peak 1) which can represent rhSP-D trimers and hexamers; a second peak (Peak 2) which can represent rhSP-D dodecamers; a third peak (Peak 3) which can represent intermediate species between rhSP-D dodecamers to rhSP-D star-like oligomeric species; and a fourth peak (Peak 4) which can represent a heterogeneous mass of rhSP-D oligomers with a radius of about 70 nm. Other species of rhSP-D can be identified by AF4-MALLS having a radius larger than 70 nm which can include aggregate species.

In some embodiments, a method for identifying oligomeric species of rhSP-D can include performing a size exclusion chromatograph HPLC (SEC HPLC). In some embodiments, a method for identifying oligomeric species of rhSP-D can include performing polyacrylamide gel electrophoresis (PAGE). In some such methods, a sample of rhSP-D can be contacted with an anionic detergent, such as of SDS, and; contacted the sample with a crosslinking reagent, such as 1% glutardialdehyde; and resolving by size the species of rhSP-D, such as by PAGE. Some methods can also include identifying the species of rhSP-D, such as performing a Western blot.

Kits

Some embodiments provided herein include kits. In some embodiments, a kit can include a pharmaceutical composition provided herein. Some embodiments include a sterile container comprising a pharmaceutical composition provided herein. Some embodiments include a pharmaceutical composition provided herein in lyophilized form, and a sterile reconstituting solution. In some embodiments, a kit can include a device for administering a pharmaceutical composition provided herein, such as an inhaler, and a nebulizer.

EXAMPLES

Example 1—Lyophilization of Certain Formulations

Lyophilization of certain formulations without rhSP-D was investigated. Primary drying temperatures for lyophilization for various buffer formulations without rhSP-D were determined using subambient differential scanning calorimetry (DSC). The formulations are listed in TABLE 2. The initial glass transition temperature ($T_g'$), mid $T_g'$, and melting temperature for various formulations without rhSP-D were determined and are summarized in TABLE 3.

TABLE 2

| Formulation | Components |
|---|---|
| F01-01 | 5 mM Histidine, 150 mM NaCl, pH 7.0 |
| F02-01 | 5 mM Histidine, 150 mM NaCl, 1 mM EDTA, pH 6.0 |
| F03-01 | 5 mM Histidine, 50 mM NaCl, 150 mM Lactose, 1 mM $CaCl_2$, pH 6.0 |
| F04-01 | 5 mM Histidine, 50 mM NaCl, 150 mM Lactose, 1 mM EDTA, pH 7.0 |
| F05-01 | 5 mM Histidine, 100 mM Lactose, 1 mM $CaCl_2$, pH 6.0 |
| F06-01 | 5 mM Histidine, 200 mM NaCl, 1 mM EDTA, pH 6.0 |
| F07-01 | 5 mM Histidine, 200 mM NaCl, 1 mM EDTA, pH 7.0 |

TABLE 3

| Formulation | Onset $T_g'$ | Mid $T_g'$ | Melting temperature (° C.) | Melting area (J/g) |
|---|---|---|---|---|
| F01-01 | ND | ND | −22.5 | 5.5 |
| F02-01 | ND | ND | −22.7 | 5.9 |
| F03-01 | −36.2 | −34.5 | ND | ND |
| F04-01 | −35.6 | −33.9 | ND | ND |
| F05-01 | −31.8 | −30.8 | ND | ND |
| F06-01 | ND | ND | −22.4 | 8.2 |
| F07-01 | ND | ND | −22.0 | 7.7 |

ND: not determined

Formulations without rhSP-D and containing NaCl had a detectable initial glass transition temperature ($T_g'$). Melting temperature for formulations F01-01, F02-01, F06-01, and F07-01 were in the range of the eutectic temperature of NaCl. Lactose and lactose/NaCl have a $T_g'$>−37° C. Thus, a primary drying temperature of −35° C. was feasible. Formulations without rhSP-D were lyophilized under conditions as shown in the TABLE 4.

TABLE 4

| Stage | Conditions |
|---|---|
| Freezing: | Cool from ambient to −5° C. in 60 min; Hold at −5 C. for 30 minutes; Cool from −5° C. to −22° C. at 0.5° C./min; Hold at −22° C. for 180 minutes; Cool from −22° C. to −55° C. at 0.5° C./min; Hold at −55° C. for 60 minutes. |
| Primary dry (vacuum setpoint: 65 mTorr): | Ramp from −55° C. to −35° C. at 0.5° C./min; Hold at −35° C. for 72 hours. |
| Secondary dry (vacuum setpoint: 65 mTorr): | Ramp from −35° C. to 25° C. at 0.05° C./min; Hold at 25° C. for 240 minutes; Ramp from 25° C. to 40° C. at 0.05° C./min; Hold at 40° C. for 180 minutes. |
| Post-run action: | Back-fill with nitrogen gas (580,000 mTorr); Stopper the vials; Lyophilization run completed. |

A comparison between capacitance and Pirani pressure gauges was used to determine the completion of primary drying. The moisture content of lyophilized formulations without rhSP-D was determined by thermogravimetric analysis (TGA). The results are summarized in TABLE 5.

TABLE 5

| Formulation | Moisture (wt/vol %) |
|---|---|
| F01-01 | 0.29 |
| F02-01 | 0.55 |
| F03-01 | 2.97 |
| F04-01 | 3.17 |

TABLE 5-continued

| Formulation | Moisture (wt/vol %) |
|---|---|
| F05-01 | 2.90 |
| F06-01 | 0.42 |
| F07-01 | 0.48 |

Example 2—Preparation and Analysis of Formulations Containing rhSP-D

Formulations containing rhSP-D were prepared by dialysis of a solution of 1 mg/ml SP-D with a particular buffer listed in TABLE 2. rhSP-D was obtained from H9D8WT Clone P1315-2A5 (Glycotope) which is a human myeloid leukemia cell line expressing rhSP-D from an integrated transgene. Example expression vectors, rhSP-D polypeptides, cell-lines, and methods of purifying rhSP-D from such cells, are provided in U.S 2019/0071693 and U.S. 2019/0071694 each of which is expressly incorporated by reference herein in its entirety. The pH and osmolality of formulations containing rhSP-D were determined to be substantially the same as the initial buffer, confirming that dialysis was substantially complete. Formulations containing rhSP-D were lyophilized, and stored for various periods of time at various temperatures including 5° C., 25° C., and 40° C. The protein concentrations of reconstituted formulations were determined. The results are summarized in TABLE 6.

TABLE 6

| | Protein concentration of formulations (mg/ml) | | | |
|---|---|---|---|---|
| Formulation | Pre-lyophilization | 0 weeks post-lyophilization | 2 weeks at 25° C. post-lyophilization | 2 weeks at 40° C. post-lyophilization |
| F01-01 | 0.97 | 0.99 | 1.09 | 1.08 |
| F02-01 | 1.00 | 1.01 | 1.09 | 1.10 |
| F03-01 | 0.98 | 0.96 | 1.04 | 1.02 |
| F04-01 | 0.30 | 0.28 | 0.37 | 0.33 |
| F05-01 | 0.86 | 0.86 | 0.96 | 0.93 |
| F06-01 | 0.94 | 1.00 | 1.06 | 1.07 |
| F07-01 | 1.00 | 1.01 | 1.16 | 1.14 |

The turbidity of reconstituted formulations containing rhSP-D was determined by measuring absorbance at 320 nm. The results are summarized in TABLE 7.

TABLE 7

| | Turbidity ($A_{320}$ nm) | | | |
|---|---|---|---|---|
| Formulation | Pre-lyophilization | 0 weeks post-lyophilization | 2 weeks at 25° C. post-lyophilization | 2 weeks at 40° C. post-lyophilization |
| F01-01 | 0.108 | 0.569 | 0.612 | 0.659 |
| F02-01 | 0087 | 0.512 | 0.642 | 0.648 |
| F03-01 | 0.088 | 0.114 | 0.110 | 0.104 |
| F04-01 | 0.073 | 0.089 | 0.087 | 0.072 |
| F05-01 | 0.103 | 0.120 | 0.124 | 0.130 |
| F06-01 | 0.068 | 0.432 | 0.531 | 0.480 |
| F07-01 | 0.062 | 0.507 | 0.530 | 0.569 |

The turbidity of the protein solutions was an indicator of protein precipitation. The low turbidity of F04-01 was likely due to the particularly low protein concentration. Formulations F03-01 and F05-01 which each contain lactose and calcium each had a relatively low turbidity. In contrast, formulations F01-01, F02-01, F06-01, and F07-01 which each contained NaCl and lacked lactose, were over five-fold more turbid after storing the lyophile for 2 weeks at 25° C. than F03-01 and F05-01. Thus, the presence of lactose and calcium, and the absence of NaCl, may promote the ability of rhSP-D to form a solution after reconstitution of a lyophile.

The distribution of different oligomeric species of rhSP-D in various reconstituted formulations containing rhSP-D was determined by an asymmetric flow field-flow fractionation (AF4) with multi-angle laser light scattering (AF4-MALLS) analysis. Example methods are also provided in U.S. Prov. App. 62/650,138 filed Mar. 29, 2018 entitled "METHODS FOR CHARACTERIZING SURFACTANT PROTEIN D (SP-D) OLIGOMERS" which is incorporated by reference herein in its entirety. For the AF4-MALLS analysis, rhSP-D samples were separated by an AF4 system (Eclipse Dual Tec, Wyatt Technology Corp., Santa Barbara, CA) followed by UV (Ultimate 3000 variable wavelength detector, Dionex Corporation, Sunnyvale, CA) and MALS analysis (Dawn Heleos II detector, Wyatt Technology Corp., Santa Barbara, CA). A Dionex Ultimate 3000 HPLC system (Dionex Corporation, Sunnyvale, CA) was used to inject the samples and deliver the mobile phase to the AF4 system. The AF4 configuration used a short channel with a 350 μm thick spacer (Wyatt Technology Corp., Santa Barbara, CA). Analysis of the data and calculations were performed using Chromeleon (Dionex Corporation, Sunnyvale, CA) and Astra (Wyatt Technology Corp., Santa Barbara, CA) software. Results from the AF4-MALLS analysis included a fractogram with several peaks. TABLE 8 lists parameters used for the AF4.

TABLE 8

| Step | Start time (min) | End time (min) | Duration (min) | Mode | X flow start (ml/min) | X flow end (ml/min) |
|---|---|---|---|---|---|---|
| 1 | 0 | 1 | 1 | Elution | | |
| 2 | 1 | 2 | 1 | Focus | | |
| 3 | 2 | 3 | 1 | Focus + inject | | |
| 4 | 3 | 6 | 3 | Focus | | |
| 5 | 6 | 6.2 | 0.2 | Elution | 0.5 | 3 |
| 6 | 6.2 | 9.2 | 3 | Elution | 3 | 3 |
| 7 | 9.2 | 19.2 | 10 | Elution | 3 | 0.18 |
| 8 | 19.2 | 29.2 | 10 | Elution | 0.18 | 0.18 |
| 9 | 29.2 | 44.2 | 15 | Elution | 0.18 | 0 |
| 10 | 44.2 | 54.2 | 10 | Elution | 0 | 0 |
| 11 | 54.2 | 59.2 | 5 | Elution + Inject | 0 | 0 |

Detector Flow: 0.5 ml/min
Inject Flow: 0.2 ml/min
Focus Flow: 0.5 ml/min
Injection Amount: 5 μg
UV detection: 214 nm
Mobile phase: 20 mM Tris, 200 mM NaCl, pH 7.4
Channel: short (145 mm)
Spacer: 350 μM
Membrane: 10 kD PES Data using AF4-MALLS was analyzed to determine absolute molar mass and size of rhSP-D at a certain time during elution. The size: mass ratio was indicative of the shape of the rhSP-D. From the size to mass ratio, it was determined that in the early stages of an elution (0-34 minutes) the rhSP-D molecule had a linear or rod-shape. For rod model calculations, the software assumed that the thickness of a rod-shaped particle was insignificant (0.0 nm) compared to its length. If the thickness was significant, its thickness or approximate thickness in nm was used. Rod thickness was estimated from AFM data, and rod lengths were determined to be consistent with AFM measurements of 136±8.1 nm. Arroyo R, et al. (2017) Biophysical Journal 112 (3): 503a which is incorporated by reference herein in its entirety. The later stages of the elution (34-45 minutes) for rhSP-D indicated that a more compact structure was being observed. A second order Debye model was employed for analysis of these stages of the elution. The second order Debye model provided better results over a wider range of molar masses, including the very large (greater than ~106 Daltons or ~50 nm RMS radius). For dodecamers of rhSP-D, molecular weight was determined to be 520.09±4.61 kDa (N=72 determinations).

A first peak in the fractogram (Peak 1) contained rhSP-D trimers and hexamers based on mass calculations according to the rod model. A second peak in the fractogram (Peak 2) contained rhSP-D dodecamers. A third peak in the fractogram (Peak 3) contained intermediate species between rhSP-D dodecamers to rhSP-D star-like oligomers based on the intermediate molecular weight as determined by the rod model. A fourth peak in the fractogram (Peak 4) contained a heterogeneous mass of rhSP-D oligomers with constant RMS radius of about 70 nm consistent with what has been observed by AFM measurements for the star-like oligomeric species, and larger species having a radius greater than 70 nm. Beyond 36 minutes in the fractogram the RMS radius increases further, indicative of further aggregate species. The relative peak area (RPA) for each peak was determined as a percentage of the total peak area of the four peaks.

To determine the distribution of oligomeric species in solution using an AF4-MALLS analysis with a greater resolution, the species of Peak 4 were analyzed further. An adjusted RPA was determined for each of Peaks 3 and 4. Specifically, aspects of the RPA of Peak 4 that corresponded to star-like oligomeric species having a constant RMS radius of about 70 nm were determined, and these aspects were removed from the RPA of Peak 4 and added to the RPA of Peak 3 to provide an adjusted RPA for Peak 4 and Peak 3. Thus, the RPA of Peak 1, RPA of Peak 2, adjusted RPA of Peak 3, and adjusted RPA of Peak 4 corresponded to the relative distributions of rhSP-D oligomeric species in the AF4-MALLS analysis for (1) trimers and hexamers; (2) dodecamers; (3) star-like oligomeric species having a radius of about 70 nm; and (4) aggregates having a radius greater than 70 nm, respectively.

Lyophiles of formulations containing rhSP-D were stored under various conditions, reconstituted and analyzed by AF4-MALLS. The results of an adjusted AF4-MALLS analysis are summarized in TABLE 9. Molecular weights of oligomeric species of rhSP-D were also determined for formulations stored at 5° C. for 5 weeks, and are summarized in TABLE 10.

TABLE 9

| | | AF4-MALLS Relative peak area (%) | | | | |
|---|---|---|---|---|---|---|
| Formulation | Condition | Peak 1 | Peak 2 | Adjusted Peak 3 | Adjusted Peak 4 | |
| F01-01 | Pre-lyophilization | 11.96 | 55.26 | 32.31 | 0.48 | a |
| | | 2.61 | 2.41 | 3.22 | 0.24 | sd |
| | 0 weeks | 14.92 | 41.21 | 40.30 | 3.57 | a |
| | | 1.19 | 2.02 | 1.40 | 0.57 | sd |
| | 25° C., 2 weeks | 20.26 | 44.33 | 32.82 | 2.58 | a |
| | | 0.59 | 0.91 | 1.08 | 0.41 | sd |
| | 40° C., 2 weeks | 13.48 | 45.15 | 38.28 | 3.09 | a |
| | | 0.57 | 1.30 | 0.67 | 1.21 | sd |
| | 5° C., 5 weeks | 11.29 | 52.17 | 32.56 | 3.98 | a |
| | | 1.01 | 0.30 | 0.83 | 0.16 | sd |

TABLE 9-continued

| | | AF4-MALLS Relative peak area (%) | | | | |
|---|---|---|---|---|---|---|
| Formulation | Condition | Peak 1 | Peak 2 | Adjusted Peak 3 | Adjusted Peak 4 | |
| F02-01 | Pre-lyophilization | 25.95 | 53.22 | 19.35 | 1.48 | a |
| | | 1.16 | 1.04 | 1.69 | 0.40 | sd |
| | 0 weeks | 24.87 | 40.84 | 29.15 | 5.15 | a |
| | | 0.77 | 1.43 | 0.87 | 0.91 | sd |
| | 25° C., 2 weeks | 38.23 | 38.33 | 20.87 | 2.56 | a |
| | | 2.57 | 0.22 | 2.47 | 0.35 | sd |
| | 40° C., 2 weeks | 34.69 | 33.02 | 29.36 | 2.93 | a |
| | | 0.95 | 1.59 | 3.58 | 1.12 | sd |
| | 5° C., 5 weeks | 6.39 | 58.40 | 30.36 | 4.84 | a |
| | | 0.13 | 0.89 | 0.87 | 0.17 | sd |
| F03-01 | Pre-lyophilization | 20.64 | 53.08 | 23.67 | 2.61 | a |
| | | 0.52 | 0.21 | 0.77 | 0.27 | sd |
| | 0 weeks | 4.50 | 38.26 | 53.92 | 3.32 | a |
| | | 0.20 | 4.44 | 3.87 | 0.68 | sd |
| | 25° C., 2 weeks | 16.09 | 45.33 | 35.89 | 2.70 | a |
| | | 3.81 | 3.21 | 1.57 | 0.21 | sd |
| | 40° C., 2 weeks | 8.77 | 46.20 | 43.23 | 1.81 | a |
| | | 1.61 | 0.29 | 2.31 | 0.48 | sd |
| | 5° C., 5 weeks | 9.00 | 55.83 | 31.89 | 3.28 | a |
| | | 0.32 | 0.39 | 0.21 | 0.15 | sd |
| F04-01 | Pre-lyophilization | 31.21 | 54.29 | 14.50 | 0.00 | a |
| | | 0.33 | 3.78 | 3.82 | 0.00 | sd |
| | 0 weeks | 17.84 | 68.26 | 13.66 | 0.24 | a |
| | | 0.84 | 2.66 | 2.81 | 0.08 | sd |
| | 25° C., 2 weeks | 19.54 | 70.76 | 9.48 | 0.23 | a |
| | | 0.14 | 0.74 | 0.87 | 0.01 | sd |
| | 40° C., 2 weeks | 19.98 | 57.22 | 21.46 | 1.35 | a |
| | | 1.24 | 0.04 | 0.91 | 0.29 | sd |
| | 5° C., 5 weeks | 15.95 | 68.45 | 12.84 | 1.16 | a |
| | | 0.75 | 39.54 | 1.51 | 0.34 | sd |
| F05-01 | Pre-lyophilization | 10.54 | 51.18 | 36.06 | 2.22 | a |
| | | 0.45 | 0.75 | 0.82 | 0.19 | sd |
| | 0 weeks | 6.95 | 43.32 | 46.16 | 3.58 | a |
| | | 0.61 | 1.44 | 1.62 | 0.47 | sd |
| | 25° C., 2 weeks | 6.07 | 48.90 | 42.80 | 2.23 | a |
| | | 0.66 | 1.81 | 2.00 | 0.08 | sd |
| | 40° C., 2 weeks | 6.03 | 43.08 | 46.28 | 4.61 | a |
| | | 0.26 | 0.64 | 0.61 | 0.85 | sd |
| | 5° C., 5 weeks | 8.20 | 57.41 | 29.89 | 4.50 | a |
| | | 0.11 | 0.44 | 0.15 | 0.46 | sd |
| F06-01 | Pre-lyophilization | 10.06 | 34.19 | 53.74 | 2.01 | a |
| | | 0.63 | 2.40 | 2.31 | 0.57 | sd |
| | 0 weeks | 6.04 | 43.52 | 44.48 | 5.96 | a |
| | | 1.60 | 3.35 | 3.64 | 1.31 | sd |
| | 25° C., 2 weeks | 8.45 | 45.07 | 42.00 | 4.49 | a |
| | | 0.24 | 0.51 | 0.22 | 0.41 | sd |
| | 40° C., 2 weeks | 9.63 | 36.51 | 43.63 | 10.23 | a |
| | | 1.48 | 4.52 | 0.74 | 6.40 | sd |
| | 5° C., 5 weeks | 7.00 | 49.64 | 37.20 | 6.16 | a |
| | | 1.17 | 1.79 | 0.09 | 0.66 | sd |
| F07-01 | Pre-lyophilization | 12.26 | 40.80 | 45.51 | 1.42 | a |
| | | 0.30 | 0.85 | 0.69 | 0.04 | sd |
| | 0 weeks | 12.17 | 41.12 | 42.25 | 4.46 | a |
| | | 0.78 | 0.82 | 1.04 | 0.55 | sd |
| | 25° C., 2 weeks | 12.85 | 34.55 | 48.02 | 4.58 | a |
| | | 0.80 | 0.94 | 1.40 | 0.33 | sd |
| | 40° C., 2 weeks | 18.49 | 33.36 | 44.02 | 4.13 | a |
| | | 1.15 | 1.13 | 0.03 | 0.12 | sd |
| | 5° C., 5 weeks | 12.43 | 46.91 | 36.35 | 4.31 | a |
| | | 0.80 | 0.74 | 0.99 | 0.44 | sd | a: average; sd: standard deviation

TABLE 10

| | Average mass (kDa) | | | | | |
|---|---|---|---|---|---|---|
| Formulation | Peak 1 | Peak 2 | Peak 3 | Peak 4 | Retention time | |
| F01-01 | 74.9 | 520.5 | 1894 | 25841 | | a |
| | 25.0 | 2.4 | 99 | 5486 | | sd |
| F02-01 | 158.5 | 521.9 | 1751 | 30689 | 22.274 | a |
| | 17.6 | 2.5 | 87 | 16873 | 0.060 | sd |

TABLE 10-continued

| Formulation | Average mass (kDa) | | | | Retention time | |
| --- | --- | --- | --- | --- | --- | --- |
| | Peak 1 | Peak 2 | Peak 3 | Peak 4 | | |
| F03-01 | 162.6 | 523.6 | 2445 | 23396 | 22.428 | a |
| | 62.4 | 2.7 | 76 | 1503 | 0.078 | sd |
| F04-01 | 397.6 | 517.7 | 2631 | 88563 | 22.674 | a |
| | 9.1 | 8.3 | 523 | 34231 | 0.185 | sd |
| F05-01 | 274.7 | 526.8 | 1971 | 136670 | 22.833 | a |
| | 124.2 | 5.3 | 447 | 55743 | 0.097 | sd |
| F06-01 | 372.2 | 516.5 | 1854 | 39336 | 23.871 | a |
| | 64.1 | 4.9 | 113 | 2081 | 0.145 | sd |
| F07-01 | 215.3 | 523.6 | 1889 | 32590 | 23.228 | a |
| | 19.0 | 4.5 | 59 | 1659 | 0.088 | sd | a = average; sd = standard deviation

At week 0 and after storing the lyophile for 2 weeks at 25° C., each formulation had a substantially similar distribution of RPAs indicative of a substantially similar distribution of rhSP-D oligomeric species.

With regard to adjusted Peak 4 which was indicative of aggregate oligomeric species of rhSP-D having a radius greater than 70 nm, formulation F06-01 was observed to have the largest increase with an adjusted RPA from 5.96% at 0 week to 10.23% after storing the lyophile for 2 weeks at 40° C. With regard to Peak 2 which was indicative of rhSP-D dodecamers, formulations F01-01, F03-01, and F05-01 each showed an increase or no substantial change in the RPA for Peak 2 between 0 week and after storing the lyophile for 2 weeks at 40° C. In contrast, formulations F02-01, F04-01, F06-01, and F07-01 each showed a decrease in the RPA for Peak 2 between 0 week and after storing the lyophile for 2 weeks at 40° C. The stability of rhSP-D dodecamers in the lyophilized cake were more stable over time under all conditions examined in formulations including F03-01 and F05-01 which contained lactose and calcium. These were also the formulations that exhibited relatively low turbidity upon reconstitution as shown herein.

Formulation F04-01 had the lowest protein concentration and the lowest adjusted RPA for Peak 4 indicative of the lowest relative fraction of aggregate rhSP-D species which suggested that protein concentration could have a role in the formation of aggregates.

Example 3—Activity of Formulations Containing rhSP-D in a Bacterial Aggregation Assay The activity of reconstituted formulations containing rhSP-D was tested in a bacterial aggregation assay. In the bacterial aggregation assay, active rhSP-D aggregates bacterial cells and reduces absorbance/increases transmission through the bacterial suspension. The bacterial aggregation assay was performed by a method substantially similar to the following method. E. coli (ATCC: Y1088) was streaked onto a bacterial agar plate and incubated at 37° C. overnight. A single colony was selected and used to inoculate an overnight culture, shaken at 37° C. overnight. A 1 mL bacterial culture was pipetted into four 1.5 ml centrifuge tubes, and centrifuged at 4,000 rpm for 5 minutes. The supernatant was discarded, and the pellet re-suspended in 1 mL buffer, (150 mM HEPES, 20 mM NaCl pH 7.4). The tubes were centrifuged at 4,000 rpm for 5 minutes and the pellet was re-suspended in 7 mL buffer. Absorbance of the bacterial suspension was measured in a spectrometer at 700 nm. The bacterial suspension was adjusted to obtain an Absorbance in the range of 1.0000 to 1.1000. 1M $CaCl_2$ was added to the suspension to obtain a final concentration of 5 mM $CaCl_2$.

rhSP-D dilutions in placebo buffer (15 µl total volume for each dilution) were created at the following concentrations: 5, 1, 0.5, 0.25, 0.1, 0 µg/ml and added to cuvettes each containing 20 µL of the HEPES-NaCl buffer. 600 µL bacterial suspension were then added to cuvettes, and absorbance was measured every 2.5 minutes for each cuvette at 700 nm, for a total of 120 minutes.

Tested concentrations of reconstituted rhSP-D included 0 µg/ml, 0.1 µg/ml, 0.25 µg/ml, 0.5 µg/ml, 1.0 µg/ml, and 5.0 µg/ml. A percentage average aggregation at 60 minutes was calculated from the absorbance value at 60 minutes at each tested concentration, according to the following formula:

$$(1-abs)*100 = \% \text{ Aggregation}$$

where 1=the measured absorbance of the E. coli suspension without rhSP-D.

Abs=The absorbance value of the E. coli suspension+rhSP-D at 60 minutes.

Percentage (%) aggregation values were averaged from 3 replicates and imported, along with the standard deviation, into GraphPad Prism v7.0c, (GraphPad, La Jolla, CA 92037). The averaged values were fit using a 4-Parameter logistic curve. The resultant values for the $EC_{50}$, and Span were determined for each reconstituted rhSP-D sample. $pEC_{50}$ is the $-Log_{10}$ of the $EC_{50}$.

Example results are presented in TABLE 11. Formulations containing rhSP-D had substantially similar potency and efficacy (curve span) before and after lyophilization in the bacterial aggregation assay, indicating that the lyophilization did not substantially affect activity of formulations tested in this assay. In addition, the formulations had substantially similar potency and efficacy under all conditions tested, indicating that although stability of the dodecamer was affected in some formulations under different conditions, this did not appear to compromise activity in the bacterial aggregation assay. See TABLE 11.

Example 4—Activity of Formulations Containing rhSP-D in TLR4 Assay

The Toll-like receptors (TLRs) have a role in both the innate immune system and the adaptive immune system, and SP-D has activity to modulate signaling through TLRs, such as Toll-like receptor 2 (TLR2) and Toll-like receptor 4 (TLR4). See e.g., Haagsman H P et al., (2008) Neonatology 93:288-294; Yamazoe M. et al., (2008) J. Biol Chem 283: 35878-35888; and Vieira F. et al., (2017) Ann Anat 211: 184-201 which are each incorporated by reference in its entirety. TLR4 activity may also modulate the severity of conditions, such as bronchopulmonary dysplasia (BPD) (Malash A H et al., (2016) Gene 592:23-28 which is incorporated by reference in its entirety). Thus, the activity of rhSP-D to modulate TLR4 activity was measured as an indication of the effect of rhSP-D on a host immune response. The activity of reconstituted formulations containing rhSP-D was tested in an LPS-TLR4 assay. In an LPS-TLR4 assay, reconstituted rhSP-D can inhibit lipopolysaccharide (LPS)-induced inflammatory cell responses by preventing LPS from binding/activating the Toll-like receptor 4 (TLR4). See e.g., Yamazoe M. et al., (2008) J. Biol Chem 283:35878-35888 which is incorporated by reference in its entirety.

The activity of reconstituted rhSP-D in a TLR4 assay was tested in a method substantially similar to the following method. HEK-Blue™ hTLR4 cells (InvivoGen, San Diego, CA, U.S.A.) were plated at a density ~20000 cells/well in 384-well plates and incubated with various concentrations of rhSP-D for 2 hours at 37° C., 5% $CO_2$. LPS (*Escherichia coli* O26: B6, L5543 Sigma Aldrich) at an $EC_{80}$ concentration was added to each well, and the cells incubated for another 22 hours at 37° C., 5% $CO_2$. TLR4 activity was measured by detaching the cells from the wells, washing the suspended cells, resuspending the cells in PBS and removing any clumps by gentle pipetting. Washed cells were transferred to a 384-well plate at a density of $20e10^3$ cells/well containing HEK blue detection medium (InvivoGen, San Diego, CA, U.S.A.) that had been made up in endotoxin-free water containing 5 mM $CaCl_2$ and 1% (v/v) BSA. Cells were incubated at 37° C. in 5% $CO_2$ for 24 hours, and activity of TLR4 was determined by measuring the activity of a secreted embryonic alkaline phosphatase (SEAP) reporter gene using a spectrophotometer at 655 nm. An $IC_{50}$ value for the rhSP-D was determined using non-linear regression analysis by fitting the data to the four-parameter logistics equation. Because only the logarithm of the $IC_{50}$ values are normally distributed, for the purposes of averaging numbers from a series of experiments, the $pIC_{50}$ values were used, defined as the $-Log_{10}$ ($IC_{50}$). A curve span was determined from the difference between the fitted maximal response ($E_{max}$) and the fitted minimal response ($E_{min}$) and corresponds to the amplitude of the dose-response curve, or efficacy of the response.

The results of TLR4 assays with reconstituted rhSP-D, along with results of a bacterial aggregation assay described in EXAMPLE 3 are summarized in TABLE 11. The data presented in TABLE 11 for the bacterial aggregation assay includes fitted curve parameters from a single dose-response curve, composed of triplicate determinations obtained from a 60-minute time-point in three independent experiments. The data presented for the TLR4 assay includes the average±SD of fitted curve parameters obtained from the indicated number of independent experiments, where each dose-response curve was composed of multiple concentrations performed in triplicate.

TABLE 11

| | | Bacterial aggregation assay | | | TLR4 receptor antagonist assay | | |
|---|---|---|---|---|---|---|---|
| Form[a] | Condition | $pEC_{50}$ (mg/ml) | Curve span ± SD of the estimate | N | Avg $pIC_{50}$ ± SD (mg/ml) | Avg curve span ± SD | N |
| F01-01 | post lyo, 0 weeks | 3.864 | 53.88 ± 2.50 | 1 | 2.6 ± 0.2 | 49.1 ± 19.8 | 3 |
| | 25° C., 2 weeks | 3.797 | 57.97 ± 1.67 | 1 | NR | NR | 3 |
| | 40° C., 2 weeks | 3.539 | 50.61 ± 3.60 | 1 | NR | NR | 3 |
| | 5° C., 5 weeks | NT | NT | | 3.0 ± 0.3 | 43.0 ± 3.2 | 3 |
| F02-01 | post lyo, 0 weeks | 3.823 | 52.93 ± 3.30 | 1 | NR | NR | 1 |
| | 25° C., 2 weeks | — | — | 1 | NR | NR | 3 |
| | 40° C., 2 weeks | 3.985 | 58.38 ± 2.142 | 1 | NR | NR | 3 |
| | 5° C., 5 weeks | NT | NT | | 3.3 ± 0.2 | 32.6 ± 21.1 | 3 |
| F03-01 | post lyo, 0 weeks | 3.971 | 50.57 ± 3.89 | 1 | 2.1 | 28.3 | 1 |
| | 25° C., 2 weeks | 4.067 | 43.70 ± 2.494 | 1 | 2.5 ± 0.43 | 48.7 ± 10.4 | 3 |
| | 40° C., 2 weeks | 4.176 | 65.06 ± 3.44 | 1 | 2.7 ± 0.2 | 49.8 ± 10.1 | 3 |
| | 5° C., 5 weeks | NT | NT | | 3.3 ± 0.04 | 39.3 ± 15.3 | 3 |
| F04-01 | post lyo, 0 weeks | 3.939 | 56.01 ± 8.25 | 1 | NT | NT | |
| | 25° C., 2 weeks | 3.877 | 55.72 ± 2.85 | 1 | NT | NT | |
| | 40° C., 2 weeks | 3.931 | 58.65 ± 5.47 | 1 | NT | NT | |
| | 5° C., 5 weeks | NT | NT | | NT | NT | |
| F05-01 | post lyo, 0 weeks | 3.967 | 54.36 ± 4.37 | 1 | 2.9 ± 0.5 | 49.0 ± 5.8 | 3 |
| | 25° C., 2 weeks | 4.139 | 61.66 ± 1.43 | 1 | 2.8 ± 0.1 | 41.0 ± 10.0 | 3 |
| | 40° C., 2 weeks | 3.983 | 50.91 ± 3.97 | 1 | 2.5 ± 0.04 | 40.9 ± 1.6 | 3 |
| | 5° C., 5 weeks | NT | NT | | 3.4 ± 0.4 | 40.4 ± 3.9 | 3 |
| F06-01 | post lyo, 0 weeks | 4.018 | 57.14 ± 3.56 | 1 | NR | NR | 3 |
| | 25° C., 2 weeks | 3.796 | 44.58 ± 1.68 | 1 | NR | NR | 3 |
| | 40° C., 2 weeks | 3.853 | 60.91 ± 2.28 | 1 | NR | NR | 2 |
| | 5° C., 5 weeks | NT | NT | | NR | NR | 3 |

TABLE 11-continued

| | | Bacterial aggregation assay | | | TLR4 receptor antagonist assay | | |
|---|---|---|---|---|---|---|---|
| Form | Condition | $pEC_{50}$ (mg/ml) | Curve span ± SD of the estimate | N | Avg $pIC_{50}$ ± SD (mg/ml) | Avg curve span ± SD | N |
| F07-01 | post lyo, 0 weeks | 3.622 | 47.05 ± 4.94 | 1 | 2.4 ± 0.2 | 44.8 ± 8.6 | 4 |
| | 25° C., 2 weeks | 3.889 | 48.11 ± 2.60 | 1 | 3.0 ± 0.7 | 34.1 ± 16.6 | 3 |
| | 40° C., 2 weeks | 3.73 | 44.30 ± 2.61 | 1 | 2.9 ± 0.7 | 30.1 ± 12.3 | 3 |
| | 5° C., 5 weeks | NT | NT | | NR | NR | 3 |

NR: no response.
NT: not tested.

All tested formulations had activity in the bacterial aggregation assay. In contrast, only a subset of formulations treated under various conditions had activity in the TLR4 assay. For F01-01, F02-01, F06-01, no result in the TLR4 assay could be determined for reconstituted lyophiles after storage for 2 weeks at 40° C. For F01-01, F02-1 no response was obtained in the TLR4 assay after two weeks in storage at either 25° C. or at 40° C. For F06-01, no response was obtained in the TLR4 assay in any condition. In contrast, formulations F03-01, F05-01, and F07-01 had activity in the TLR4 assay for reconstituted lyophiles after storage for 2 weeks at 40° C. Moreover, unlike formulation F07-01, formulations F03-01, F05-01 which each contained lactose and calcium also had activity in the TLR4 assay for reconstituted lyophiles after storage for 5 weeks at 5° C. Notably, as shown in Example 2, F03-01 and F05-01 were also the only formulations that maintained stability of the dodecamer and the aggregate under all conditions tested and exhibited relatively low turbidity upon reconstitution. Taken together, the data indicated that formulations that contained lactose and $CaCl_2$ displayed better ability to stabilize the SP-D oligomeric state and maintain activity than the formulations that contained NaCl. Therefore, formulations containing lactose and $CaCl_2$ were selected for further study.

Example 5—Multivariate Analysis of rhSP-D Oligomeric Forms

A multivariate statistical analysis was performed to determine any correlation between peaks observed in fractograms in AF4-MALLS analyses for various formulations of rhSP-D, and activity of rhSP-D samples in either the bacterial aggregation assay or the TLR4 assay. Digitized fractograms obtained from more than 40 different samples were used as a data matrix, and correlations to the measured $pIC_{50}$ values from the TLR4 assay, or $pEC_{50}$ results from bacterial aggregation activity assays were determined using PLS.

A full cross validation was performed on all calibration models using standard techniques. See e.g., Katz, M. H. "Multivariate Analysis: A Practice Guide for Clinicians." Cambridge University Press, New York, pp. 158-162 (1999); Stahle, L. et al., (1988) "Multivariate data analysis and experimental design in biomedical research. Prog. Med. Chem. 25:291-338; Wold S. (2001) "PLS-regression: a basic tool of chemometrics." Chemom. Intell. Lab. Syst. 58:109-130 which are each incorporated by reference in its entirety. Briefly, one sample was removed at a time, the data set was recalibrated, and a new model was constructed. This process was repeated until all the calibration samples were removed once and quantified as a validation model. Therefore, the first set, containing all samples was referred to as the calibration set and the one after cross-validation as the validation set. The jack-knife algorithm was used to determine statistical significance for any factor used in constructing partial least square (PLS) models (Martens, H. et al., (2001) "Multivariate Analysis of Quality: An Introduction" Wiley and Sons, Chichester, UK).

With regard to a correlation between particular peaks observed in the AF4-MALLS analysis and activity in the bacterial aggregation assay for various formulations of rhSP-D, the majority of the activity was found to reside in Peaks 1 and 2, with some persisting throughout Peak 3. A negative correlation was found between Peak 4 and activity in the bacterial aggregation assay. With regard to a correlation between particular peaks observed in the AF4-MALLS analysis and activity in the TLR4 assay for various formulations of rhSP-D, the activity was found to localize almost exclusively in the Peak 2. Thus, activity of rhSP-D in the TLR4 assay was directly related to dodecamer species of rhSP-D. Notably, the aggregate species with radius >70 nm in adjusted Peak 4 was not associated with activity in either the bacterial aggregation assay or the TLR4 assay, confirming that this species represented inactive forms of rhSP-D.

Example 6—Formulations Containing rhSP-D, Lactose and $CaCl_2$

A second generation of formulations listed in TABLE 12 were prepared from a single batch of rhSP-D by dialysis of the protein solution with the formulation buffer. Formulations were lyophilized by a method substantially similar to the method described above in EXAMPLE 1.

TABLE 12

| Formulation | Components | Reconstitution media after lyophilization |
|---|---|---|
| F01-02 | 1 mg/ml rhSP-D, 5 mM Histidine, 265 mM Lactose, 1 mM $CaCl_2$, pH 6.0 | Water |
| F02-02 | 2 mg/ml rhSP-D, 5 mM Histidine, 265 mM Lactose, 1 mM $CaCl_2$, pH 6.0 | Water |
| F03-02 | 1 mg/ml rhSP-D, 5 mM Histidine, 265 mM Lactose, 1 mM $CaCl_2$, pH 6.0, +0.01% Tyloxapol | Water |
| F04-02 | 1 mg/ml rhSP-D, 5 mM Histidine, 100 mM Lactose, 1 mM $CaCl_2$, pH 6.0 | 0.9% NaCl |

TABLE 12-continued

| Formulation | Components | Reconstitution media after lyophilization |
|---|---|---|
| F05-02 | 2 mg/ml rhSP-D, 5 mM Histidine, 100 mM Lactose, 1 mM CaCl$_2$, pH 6.0 | 0.9% NaCl |
| F06-02 | 1 mg/ml rhSP-D, 5 mM Histidine, 100 mM Lactose, 1 mM CaCl$_2$, pH 6.0, +0.01% Tyloxapol | 0.9% NaCl |
| F07-02 | 1 mg/ml rhSP-D, 5 mM Histidine, 265 mM Lactose, 5 mM CaCl$_2$, pH 6.0 | Water |
| F08-02 | 1 mg/ml rhSP-D, 5 mM Histidine, 100 mM Lactose, 5 mM CaCl$_2$, pH 6.0 | 0.9% NaCl |
| F09-02 | 1 mg/ml rhSP-D, 5 mM Histidine, 265 mM Lactose, 1 mM CaCl$_2$, pH 7.0 | Water |
| F10-02 | 1 mg/ml rhSP-D, 5 mM Histidine, 100 mM Lactose, 1 mM CaCl$_2$, pH 7.0 | 0.9% NaCl |
| F11-02 | 1 mg/ml rhSP-D, 5 mM Histidine, 50 mM NaCl, 170 mM Lactose, 1 mM CaCl$_2$, pH 6.0 | Water |
| F12-02 | 1 mg/ml rhSP-D, 5 mM Histidine, 50 mM NaCl, 170 mM Lactose, 5 mM CaCl$_2$, pH 6.0 | Water |

Lyophiles were subjected to various conditions, reconstituted, and the activities of the reconstituted lyophiles were examined in the bacterial aggregation assay. The various formulations of rhSP-D were active in bacterial aggregation assay under the tested conditions for the various conditions. Example results for activities of F02-02 and F07-02 in the bacterial aggregation assay are summarized in TABLE 13.

TABLE 13

| | | Bacterial aggregation assay | | |
|---|---|---|---|---|
| Form$^n$ | Condition | pEC$_{50}$ (mg/ml) | Curve span ± SD of the estimate | N |
| F02-02 | post lyo, 0 weeks | 4.161 | 49.86 ± 2.31 | 1 |
| | 40° C., 3 weeks | 4.199 | 53.78 ± 2.75 | 1 |
| | 25° C., 5 weeks | 4.168 | 58.33 ± 2.49 | 1 |
| | 5° C., 7.5 weeks | 4.122 | 53.13 ± 2.91 | 1 |
| F07-02 | post lyo, 0 weeks | 3.870 | 58.53 ± 2.62 | 1 |
| | 40° C., 3 weeks | 3.900 | 51.3 ± 1.66 | 1 |
| | 25° C., 5 weeks | 4.033 | 54.43 ± 4.22 | 1 |
| | 5° C., 7.5 weeks | 4.049 | 50.54 ± 3.70 | 1 |
| | 25° C., 10 weeks | 3.809 | 38.36 ± 3.91 | 1 |

The activity of formulations under various conditions in the TLR4 assay was determined by a method substantially similar as described herein. The results are summarized in TABLE 14.

The distribution of rhSP-D oligomeric species in reconstituted lyophiles was also examined by an AF4-MALLS analysis using a method substantially similar to the method described herein. As well as summarizing the results of the activity of formulations in the TLR4 assay, TABLE 14 also summarizes the relative peak area (RPA) for Peak 2 which corresponds to the relative distribution of rhSP-D dodecamers; and an adjusted RPA for Peak 4 which corresponds to the relative distribution of rhSP-D having a radius greater than 70 nm.

TABLE 14

| | | TLR4 assay | | | AF4-MALLS RPA (%) | |
|---|---|---|---|---|---|---|
| Form$^n$ | Condition | Avg pIC$_{50}$ ± SD (mg/ml) | Avg curve span ± SD | N | Peak 2 | Adjusted Peak 4 |
| F01-02 | 0 weeks | 2.4 ± 0.01 | 39.0 ± 22.5 | 2 | 41.79 | 1.26 |
| | 40° C., 3 weeks | 2.6 ± 0.1 | 31.3 ± 12.6 | 4 | 41.93 | 1.79 |
| | 25° C., 5 weeks | 2.6 ± 0.2 | 32.4 ± 15.3 | 4 | 39.83 | 3.51 |
| | 5° C., 7.5 weeks | 2.5 ± 0.3 | 23.8 ± 1.7 | 3 | 45.77 | 2.68 |
| | 25° C., 10 weeks | 2.8 ± 0.3 | 35.6 ± 17.0 | 3 | 38.59 | 3.25 |
| F02-02 | 0 weeks | 2.4 ± 0.2 | 43.0 ± 20.9 | 3 | 49.85 | 1.21 |
| | 40° C., 3 weeks | 2.4 ± 0.1 | 52.7 ± 30.2 | 4 | 49.61 | 3.12 |
| | 25° C., 5 weeks | 2.1 ± 0.2 | 27.7 ± 7.6 | 3 | 40.66 | 2.43 |
| | 5° C., 7.5 weeks | 1.8 ± 0.1 | 29.0 ± 14.9 | 4 | 48.64 | 1.42 |
| | 25° C., 10 weeks | NT | NT | | | |
| F04-02 | 0 weeks | Activity not reproducible | Activity not reproducible | 3 | 56.25 | 0.98 |
| | 40° C., 3 weeks | 2.4 ± 0.8 | 24.3 ± 9.1 | 3 | 47.06 | 2.25 |
| | 25° C., 5 weeks | 2.6 ± 0.2 | 41.0 ± 23.0 | 3 | 42.13 | 4.03 |
| | 5° C., 7.5 weeks | 2.5 ± 0.3 | 36.7 ± 5.0 | 3 | 44.63 | 2.62 |
| | 25° C., 10 weeks | 2.4 ± 0.2 | 33.3 ± 18.3 | 3 | 38.52 | 1.42 |

TABLE 14-continued

| Form[n] | Condition | TLR4 assay Avg pIC$_{50}$ ± SD (mg/ml) | Avg curve span ± SD | N | AF4-MALLS RPA (%) Peak 2 | Adjusted Peak 4 |
|---|---|---|---|---|---|---|
| F05-02 | 0 weeks | 2.5 ± 0.8 | 68.0 ± 10.3 | 3 | 55.76 | 1.47 |
| | 40° C., 3 weeks | 2.1 ± 0.4 | 28.8 ± 8.6 | 3 | 45.86 | 2.46 |
| | 25° C., 5 weeks | 2.4 ± 0.1 | 34.5 ± 11.2 | 4 | 41.18 | 3.57 |
| | 5° C., 7.5 weeks | 2.2 ± 0.4 | 25.3 ± 8.8 | 3 | 45.98 | 1.62 |
| | 25° C., 10 weeks | 1.8 ± 0.4 | 22.7 ± 1.0 | 3 | 41.81 | 0.98 |
| F07-02 | 0 weeks | 2.7 ± 0.2 | 55.8 ± 10.5 | 3 | 44.10 | 1.21 |
| | 40° C., 3 weeks | 3.0 ± 0.1 | 33.5 ± 8.1 | 4 | 49.30 | 0.73 |
| | 25° C., 5 weeks | 2.4 ± 0.1 | 31.8 ± 15.4 | 3 | 43.42 | 1.61 |
| | 5° C., 7.5 weeks | 2.0 ± 0.3 | 39.8 ± 17.3 | 4 | 49.52 | 1.45 |
| | 25° C., 10 weeks | 2.2 ± 0.4 | 26.6 ± 10.4 | 4 | 45.49 | 2.55 |
| F08-02 | 0 weeks | Activity not reproducible | Activity not reproducible | 4 | 43.52 | 1.39 |
| | 40° C., 3 weeks | 2.6 ± 0.5 | 28.6 ± 11.7 | 5 | | |
| | 25° C., 5 weeks | 2.6 ± 0.1 | 31.3 ± 19.4 | 4 | 40.35 | 2.29 |
| | 5° C., 7.5 weeks | 2.6 ± 0.1 | 28.7 ± 3.1 | 3 | 46.53 | 2.16 |
| | 25° C., 10 weeks | 2.0 ± 0.04 | 24.3 ± 9.6 | 3 | 38.82 | 2.19 |
| F09-02 | 0 weeks | 2.6 ± 0.1 | 65.2 ± 36.3 | 3 | 50.23 | 1.56 |
| | 40° C., 3 weeks | 2.7 ± 0.1 | 25.0 ± 9.6 | 4 | 45.52 | 1.70 |
| | 25° C., 5 weeks | 2.5 ± 0.2 | 33.0 ± 13.0 | 4 | 42.36 | 2.28 |
| | 5° C., 7.5 weeks | 2.7 ± 0.2 | 24.2 ± 10.1 | 3 | 45.48 | 1.34 |
| | 25° C., 10 weeks | No activity | No activity | 3 | 39.93 | 2.37 |
| F10-02 | 0 weeks | Activity not reproducible | Activity not reproducible | 4 | 38.87 | 1.72 |
| | 40° C., 3 weeks | 2.5 ± 0.2 | 38.0 ± 19.3 | 4 | 44.69 | |
| | 25° C., 5 weeks | 2.7 ± 0.2 | 34.0 ± 9.9 | 4 | 41.68 | 1.87 |
| | 5° C., 7.5 weeks | 2.4 ± 0.2 | 23.1 ± 3.2 | 3 | 43.14 | 2.06 |
| | 25° C., 10 weeks | No activity | No activity | 3 | 44.05 | 2.22 |
| F11-02 | 0 weeks | 2.5 ± 0.60 | 56.3 ± 26.0 | 3 | 46.13 | 1.46 |
| | 40° C., 3 weeks | 2.9 ± 0.3 | 38.4 ± 17.8 | 4 | 34.19 | 7.05 |
| | 25° C., 5 weeks | 2.2 ± 0.1 | 31.3 ± 9.9 | 4 | 39.21 | 1.94 |
| | 5° C., 7.5 weeks | 2.5 ± 0.2 | 25.4 ± 7.6 | 3 | 45.20 | 3.14 |
| | 25° C., 10 weeks | No activity | No activity | 3 | 43.41 | 2.12 |
| F12-02 | 0 weeks | 2.8 ± 0.2 | 59.6 ± 11.9 | 2 | 46.74 | 1.58 |
| | 40° C., 3 weeks | NT | NT | | | |
| | 25° C., 5 weeks | 2.4 ± 0.2 | 42.8 ± 23.6 | 4 | 37.75 | 1.50 |
| | 5° C., 7.5 weeks | NT | NT | | | |
| | 25° C., 10 weeks | NT | NT | | | |

NT: not tested

Activity in the TLR4 assay could not be determined for formulations F03-02 and F06-02 which each contain tyloxapol because the formulation buffer itself exhibited antagonistic effects in the TLR4 assay which is a readout for the TLR4 assay. Formulations F09-02, F10-02, and F11-02 each lost activity in the TLR4 assay after the lyophile was stored for 10 weeks at 25° C. Formulations F10-02, F11-02 and F12-02 included the lowest observed RPAs for Peak 2. Formulation F07-02 consistently had the highest RPA for Peak 2 with the lowest RPA for the Aggregate in Peak 4 for all various conditions studied.

Lyophiles of formulations F01-02, F02-02, F07-02, that were reconstituted in water were consistently active in the TLR4 assay under various storage conditions. These formulations also maintained the stability of the dodecamer for 72 hours at 2-8° C. upon reconstitution (TABLE 15). However, the levels of dodecamer (Peak 2) in the lyophile were higher over time for formulations F02-02 and F07-02 and the levels of inactive aggregate in the reconstituted solution were lower for F02-02 and F07-02 than for F01-02 after storage at 2-8° C. for 72 hours (TABLE 15).

Of all of the formulations evaluated, only F02-02 and F07-02 exhibited the characteristics of consistent activity in the TLR4 assay after reconstitution, consistently higher values for a Peak 2 RPA associated with rhSP-D dodecamers, and lower values for an adjusted Peak 4 RPA associated with rhSP-D aggregates having a radius greater than 70 nm throughout the 10 week time period, regardless of storage temperature of the lyophile. Together, the data implied that stability and activity of rhSP-D was maintained in a formulation in Histidine buffer at pH 6, with higher levels of lactose, containing at least 1 mM $CaCl_2$ in the absence of added NaCl, and with the lyophile being reconstituted in water.

A second AF4-MALLS analysis was performed to investigate the stability of reconstituted formulations. Lyophiles were subjected to various conditions, reconstituted, stored for 72 hours at 2-8° C., and then the distribution of rhSP-D oligomeric species in reconstituted lyophiles was examined by an AF4-MALLS analysis using a method substantially similar to the method described above. TABLE 15 lists the various conditions under which the lyophiles were subjected, and lists an RPA for Peak 2 and an adjusted RPA for Peak 4 which correspond to the relative distribution of rhSP-D dodecamers and rhSP-D aggregates having a radius greater than 70 nm, respectively.

A comparison of the RPA for Peak 2 in reconstituted samples after storage for 72 hours at 2-8° C. (TABLE 15) with the RPA for Peak 2 shortly after reconstitution (TABLE 14) revealed that the lyophile formulation and the reconstitution solution affected dodecamer stability. Lyophiles of formulations F04-02, F05-02, F08-02, and F10-02 that had been stored for 5 weeks at 25° C., reconstituted in saline and stored for 72 hours at 2-8° C. all exhibited a >5% increase in the RPAs for Peak 2 in comparison to the RPAs for Peak 2 that had been stored for 5 weeks at 25° C., reconstituted in saline and analyzed shortly thereafter. For the lyophiles that had been stored for 7½ weeks at 5° C., these same formulations had decreased RPAs for Peak 2 in comparison for the RPAs for Peak 2 obtained shortly after reconstitution. However, lyophiles of formulations F02-02 and F07-02 that had been stored for either 5 weeks at 25° C. or 7½ weeks at 5° C., reconstituted in water and stored for 72 hours at 2-8° C., had substantially stable RPAs for Peak 2, with changes in RPA<4%. Therefore, reconstitution in saline reduced stability of rhSP-D as demonstrated in an AF4-MALLS analysis.

TABLE 15

| Formulation | Condition | AF4-MALLS RPA (%) Peak 2 | Adjusted Peak 4 |
|---|---|---|---|
| F01-02 | 0 weeks | N/A | N/A |
| | lyophilized: 5 weeks, 25° C.; then reconstituted: 72 hours, 2-8° C. | 42.43 | 1.91 |
| | lyophilized: 7½ weeks, 5° C.; then reconstituted: 72 hours, 2-8° C. | 42.75 | 3.08 |
| F02-02 | 0 weeks | 49.61 | N/A |
| | lyophilized: 5 weeks, 25° C.; then reconstituted: 72 hours, 2-8° C. | 44.57 | 1.24 |
| | lyophilized: 7½ weeks, 5° C.; then reconstituted: 72 hours, 2-8° C. | 45.92 | 1.93 |
| F03-02 | 0 weeks | N/A | N/A |
| | lyophilized: 5 weeks, 25° C.; then reconstituted: 72 hours, 2-8° C. | 46.13 | N/A |
| | lyophilized: 7½ weeks, 5° C.; then reconstituted: 72 hours, 2-8° C. | N/A | 2.06 |
| F04-02 | 0 weeks | 47.71 | N/A |
| | lyophilized: 5 weeks, 25° C.; then reconstituted: 72 hours, 2-8° C. | 51.31 | 0.64 |
| | lyophilized: 7½ weeks, 5° C.; then reconstituted: 72 hours, 2-8° C. | 37.44 | 1.97 |
| F05-02 | 0 weeks | 55.21 | N/A |
| | lyophilized: 5 weeks, 25° C.; then reconstituted: 72 hours, 2-8° C. | 48.85 | 0.48 |
| | lyophilized: 7½ weeks, 5° C.; then reconstituted: 72 hours, 2-8° C. | N/A | N/A |
| F06-02 | 0 weeks | N/A | N/A |
| | lyophilized: 5 weeks, 25° C.; then reconstituted: 72 hours, 2-8° C. | 37.89 | 0.19 |
| | lyophilized: 7½ weeks, 5° C.; then reconstituted: 72 hours, 2-8° C. | N/A | N/A |
| F07-02 | 0 weeks | 35.26 | N/A |
| | lyophilized: 5 weeks, 25° C.; then reconstituted: 72 hours, 2-8° C. | 41.78 | 3.18 |
| | lyophilized: 7½ weeks, 5° C.; then reconstituted: 72 hours, 2-8° C. | 49.64 | 1.93 |
| F08-02 | 0 weeks | 36.98 | N/A |
| | lyophilized: 5 weeks, 25° C.; then reconstituted: 72 hours, 2-8° C. | 53.79 | 0.89 |
| | lyophilized: 7½ weeks, 5° C.; then reconstituted: 72 hours, 2-8° C. | 39.52 | 2.79 |
| F09-02 | 0 weeks | 49.06 | N/A |
| | lyophilized: 5 weeks, 25° C.; then reconstituted: 72 hours, 2-8° C. | 49.04 | 0.63 |
| | lyophilized: 7½ weeks, 5° C.; then reconstituted: 72 hours, 2-8° C. | 40.99 | 1.84 |
| F10-02 | 0 weeks | 30.80 | N/A |
| | lyophilized: 5 weeks, 25° C.; then reconstituted: 72 hours, 2-8° C. | 46.88 | 1.02 |
| | lyophilized: 7½ weeks, 5° C.; then reconstituted: 72 hours, 2-8° C. | 39.86 | 1.94 |
| F11-02 | 0 weeks | 49.64 | N/A |
| | lyophilized: 5 weeks, 25° C.; then reconstituted: 72 hours, 2-8° C. | 40.70 | N/A |
| | lyophilized: 7½ weeks, 5° C.; then reconstituted: 72 hours, 2-8° C. | 38.31 | N/A |
| F12-02 | 0 weeks | 42.04 | N/A |
| | lyophilized: 5 weeks, 25° C.; then reconstituted: 72 hours, 2-8° C. | 37.58 | N/A |
| | lyophilized: 7½ weeks, 5° C.; then reconstituted: 72 hours, 2-8° C. | N/A | N/A |

N/A: not available

Example 7—Stability of Lyophilized Formulations Containing rhSP-D, Lactose and $CaCl_2$ Formulations of rhSP-D containing either 2 mg/ml or 4 mg/ml rhSP-D, in 5 mM Histidine, 265 mM Lactose, and 5 mM $CaCl_2$, pH 6.0 were prepared from a single batch of rhSP-D by dialysis of the protein solution with buffer. Formulations were lyophilized by a method substantially similar to the method described above in EXAMPLE 1.

Lyophiles were subjected to various conditions, reconstituted in water, and analyzed. The activity of reconstituted lyophiles was measured using the bacterial aggregation assay, and the TLR4 assay. The distribution of rhSP-D oligomeric species in reconstituted lyophiles was also examined by an AF4-MALLS analysis using a method substantially similar to the method described herein.

Six-Month Study (2 mg/ml rhSP-D)

Figure 2:
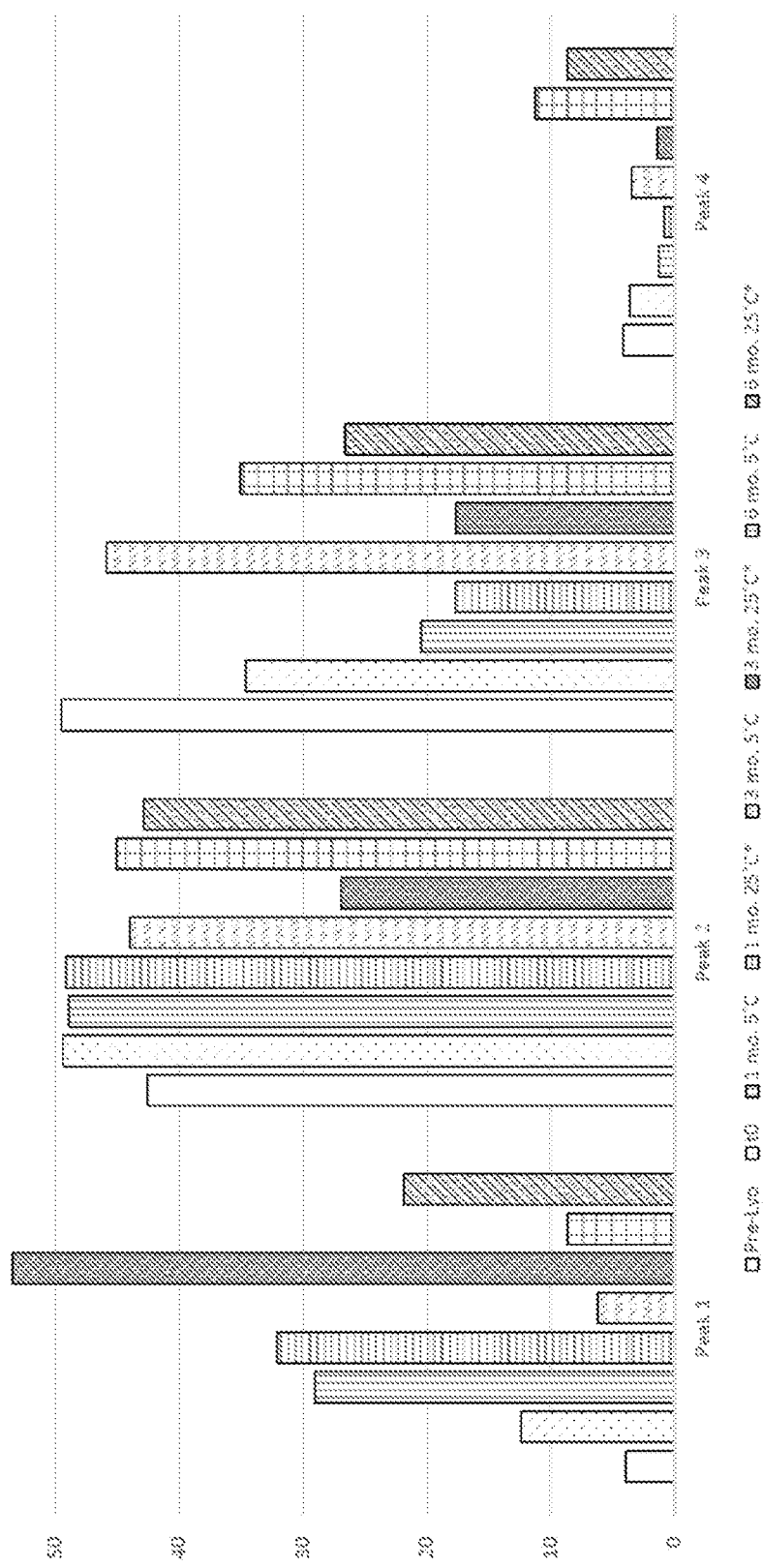
FIG. 2 is a bar chart that depicts a 6-month lyophile stability study and shows a distribution of different SP-D oligomeric species represented by either Peak 1, Peak 2, Peak 3 or Peak 4 of an AF4-MALLS analysis for a 2 mg/ml reconstituted lyophile of rhSP-D that had been stored at either 5° C. or 25° C. for a period of 1, 3, or 6 months.

A six-month study was performed with 2 mg/ml rhSP-D, in 5 mM Histidine, 265 mM Lactose, and 5 mM $CaCl_2$, pH 6.0. Example results for activities of reconstituted formulations in the bacterial aggregation assay are summarized in TABLE 14. Example results for activities of reconstituted formulations in the TLR4 assay are summarized in TABLE 15. Example results for the distribution of oligomeric species in reconstituted lyophiles prepared from a different batch of rhSP-D than the batch used in the bacterial aggregation assay and TLR4 assay of TABLE 14 and TABLE 15, are depicted in FIG. 2. The 3 month sample at 25° C., was held at 45° C. for 1 week. In this study, oligomeric species showed a tendency to interconvert between Peaks 2 and 3, and between Peaks 1 and 2, during the first 3 months. After 3 months, the aggregation Peak 4 increased significantly. Samples held at 25° C. or 5° C. had substantially similar activities and distribution of oligomeric species. As shown in TABLE 15, the antagonist potency in the TLR4 assay at 3 and 6 months for this batch of rhSP-D was similar to that at t0, and within the error of the assay (data not shown). Together the data from both SP-D batches indicate that samples held for 6 months at 25° C. did not perform substantially worse in the activity assays than those held for 6 months at 5° C., and that potency in the activity assays was maintained.

TABLE 14

Bacterial aggregation assay

| Conditions | Avg $pEC_{50}$ ± SD | $EC_{50}$ (mg/ml) | Avg $E_{max}$ ± SD (Curve Span) | N |
|---|---|---|---|---|
| 2 mg/ml; pre-lyophilization | 2.94 | 0.00115 | 36.98 ± 5.142 | 1 |
| 2 mg/ml; 0 months post-lyophilization | 2.95 | 0.0013 | 48.23 ± 3.79 | 1 |
| 2 mg/ml; 3 months post-lyophilization at 5° C. | 3.13 | 0.00073 | 57.66 ± 2.97 | 1 |
| 2 mg/ml; 3 months post-lyophilization at 25° C. | 3.08 | 0.00083 | 43.19 ± 2.09 | 1 |
| 2 mg/ml; 6 months post-lyophilization at 5° C. | 2.73 | 0.0018 | 55.77 ± 5.944 | 1 |
| 2 mg/ml; 6 months post-lyophilization at 25° C. | 2.19 | 0.0064 | 43.39 ± 8.391 | 1 |

TABLE 15

TLR4 assay

| Conditions | Avg $pIC_{50}$ ± SD | $IC_{50}$ (mg/ml) | Avg $E_{max}$ ± SD (Curve Span) | N |
|---|---|---|---|---|
| 2 mg/ml; pre-lyophilization | 2.67 ± 0.16 | 0.0022 | 75.74 ± 50.09 | 3 |
| 2 mg/ml; 0 months post-lyophilization | 2.5 ± 0.11 | 0.0028 | 68.65 ± 42.15 | 3 |
| 2 mg/ml; 3 months post-lyophilization at 5° C. | 2.24 ± 0.09 | 0.0059 | 36.49 ± 13 | 5 |
| 2 mg/ml; 3 months post-lyophilization at 25° C. | 2.14 ± 0.11 | 0.0074 | 34.62 ± 10.90 | 3 |
| 2 mg/ml; 6 months post-lyophilization at 5° C. | 2.71 ± 0.26 | 0.0022 | 22.97 ± 5.83 | 3 |
| 2 mg/ml; 6 months post-lyophilization at 25° C. | 2.76 ± 0.09 | 0.0018 | 24.20 ± 2.33 | 3 |

Three-Month Study (2 mg/ml and 4 mg/ml rhSP-D)

Figure 3:
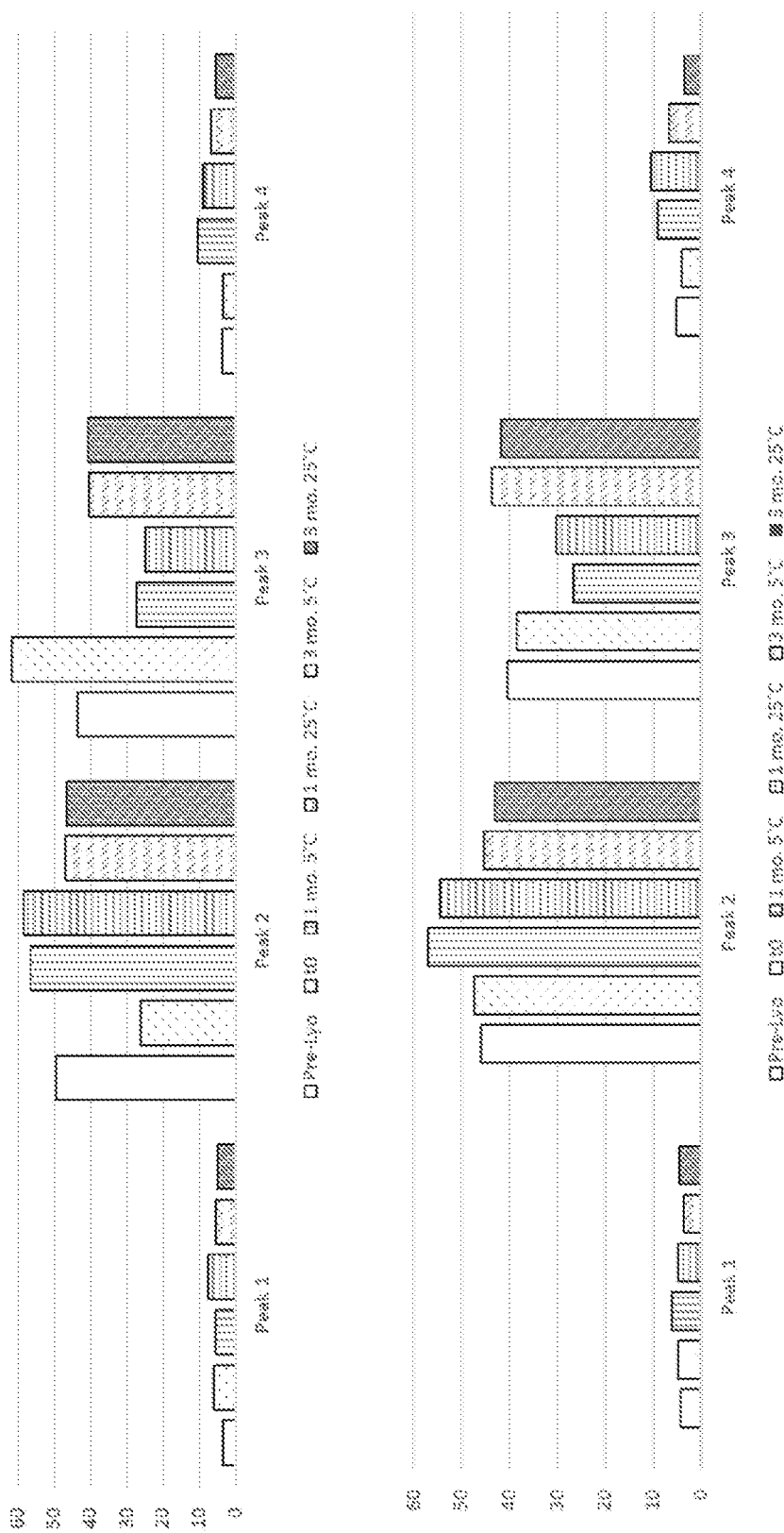
FIG. 3 is a set of bar chart panels that depict a 3-month lyophile stability study and shows a distribution of different SP-D oligomeric species represented by either Peak 1, Peak 2, Peak 3 or Peak 4 of an AF4-MALLS analysis for lyophiles of rhSP-D that had been reconstituted at either 2 mg/ml (upper panel) or 4 mg/ml (lower panel) and stored at either 5° C., or 25° C. for a period of 1 or 3 months.

A three-month study was performed with 2 mg/ml rhSP-D or 4 mg/ml, in 5 mM Histidine, 265 mM Lactose, and 5 mM CaCl2, pH 6.0. Example results for activities of reconstituted formulations in the bacterial aggregation assay are summarized in TABLE 16. Example results for activities of reconstituted formulations in the TLR4 assay are summarized in TABLE 17. Example results for the distribution of oligomeric species in reconstituted lyophiles are depicted in FIG. 3 (upper panel: 2 mg/ml; lower panel: 4 mg/ml). In this study, samples held at 25° C. or at 5° C. had substantially similar activities and distribution of oligomeric species. Substantially no interconversion to lower order (Peak 1) species was observed. At three months, Peak 2 species tended to interconvert to Peak 3 species. Activity was maintained in both the bacterial aggregation assay and the TLR4 assay, as evidenced by similar potency values (within the error of the assays) over the entire 3 month period, regardless of storage temperature.

TABLE 16

Bacterial aggregation assay

| Conditions | Avg $pEC_{50}$ ± SD | $EC_{50}$ (mg/ml) | Avg $E_{max}$ ± SD (Curve Span) | N |
|---|---|---|---|---|
| 4 mg/ml; pre-lyophilization | 2.96 | 0.0011 | 39.44 ± 5.05 | 1 |
| 4 mg/ml; 0 months post-lyophilization | 3.05 | 0.0009 | 47.37 ± 3.65 | 1 |
| 4 mg/ml; 1 month post-lyophilization at 5° C. | 3.08 | 0.00082 | 49.43 ± 2.54 | 1 |
| 4 mg/ml; 1 month post-lyophilization at 25° C. | 3.23 | 0.00059 | 40.03 ± 2.74 | 1 |
| 4 mg/ml; 3 month post-lyophilization at 5° C. | 2.36 | 0.00437 | 45.76 ± 5.11 | 1 |
| 4 mg/ml; 3 month post-lyophilization at 25° C. | 2.26 | 0.00550 | 51.96 ± 10.72 | 1 |
| 2 mg/ml; pre-lyophilization | 2.84 | 0.0014 | 49.19 ± 3.57 | 1 |
| 2 mg/ml; 0 months post-lyophilization | 3.08 | 0.00083 | 50.83 ± 3.38 | 1 |
| 2 mg/ml; 1 month post-lyophilization at 5° C. | 3.07 | 0.00085 | 50.51 ± 2.92 | 1 |

TABLE 16-continued

Bacterial aggregation assay

| Conditions | Avg pEC$_{50}$ ± SD | EC$_{50}$ (mg/ml) | Avg E$_{max}$ ± SD (Curve Span) | N |
|---|---|---|---|---|
| 2 mg/ml; 1 month post-lyophilization at 25° C. | 3.02 | 0.00095 | 46.27 ± 3.55 | 1 |
| 2 mg/ml; 3 month post-lyophilization at 5° C. | 2.95 | 0.00111 | 50.8 ± 3.668 | 1 |
| 2 mg/ml; 3 month post-lyophilization at 25° C. | 2.88 | 0.001324 | 45.08 ± 4.048 | 1 |

TABLE 17

TLR4 assay

| Conditions | Avg pIC$_{50}$ ± SD | IC$_{50}$ (mg/ml) | Avg E$_{max}$ ± SD (Curve Span) | N |
|---|---|---|---|---|
| 4 mg/ml; pre-lyophilization | 1.59 ± 0.09 | 0.0263 | 29.89 ± 11.18 | 3 |
| 4 mg/ml; 0 months post-lyophilization | 1.45 ± 0.13 | 0.0368 | 26.99 ± 10.22 | 3 |
| 4 mg/ml; 1 month post-lyophilization at 5° C. | 2.00 ± 0.17 | 0.0105 | 45.10 ± 24.65 | 4 |
| 4 mg/ml; 1 month post-lyophilization at 25° C. | 2.11 ± 0.11 | 0.0079 | 45.98 ± 16.92 | 4 |
| 4 mg/ml; 3 month post-lyophilization at 5° C. | 2.12 ± 0.13 | 0.0079 | 19.80 ± 0.87 | 3 |
| 4 mg/ml; 3 month post-lyophilization at 25° C. | 2.24 ± 0.26 | 0.0058 | 19.45 ± 2.46 | 3 |
| 2 mg/ml; pre-lyophilization | no response | | | |
| 2 mg/ml; 0 months post-lyophilization | no response | | | |
| 2 mg/ml; 1 month post-lyophilization at 5° C. | 2.55 ± 0.12 | 0.0029 | 26.12 ± 8.46 | 3 |
| 2 mg/ml; 1 month post-lyophilization at 25° C. | 2.44 ± 0.23 | 0.0040 | 29.93 ± 6.34 | 3 |
| 2 mg/ml; 3 month post-lyophilization at 5° C. | 2.63 ± 0.23 | 0.0026 | 22.94 ± 0.23 | 3 |
| 2 mg/ml; 3 month post-lyophilization at 25° C. | 2.47 ± 0.20 | 0.0037 | 20.36 ± 6.27 | 3 |

Example 8—Stability of Formulations During Freeze/Thaw Cycles

Formulations of rhSP-D containing either 2 mg/ml or 4 mg/ml rhSP-D, in 5 mM Histidine, 265 mM Lactose, and 5 mM CaCl$_2$, pH 6.0 were prepared. Samples were aliquoted and frozen by either flash freezing in which samples were submerged into liquid nitrogen, or by placing the sample into freezer at −80° C. A freeze/thaw cycle included freezing the aliquot and thawing at room temp. Samples were analyzed over several cycles including: t0; 1×; 3×; and 5×.

Figure 4:
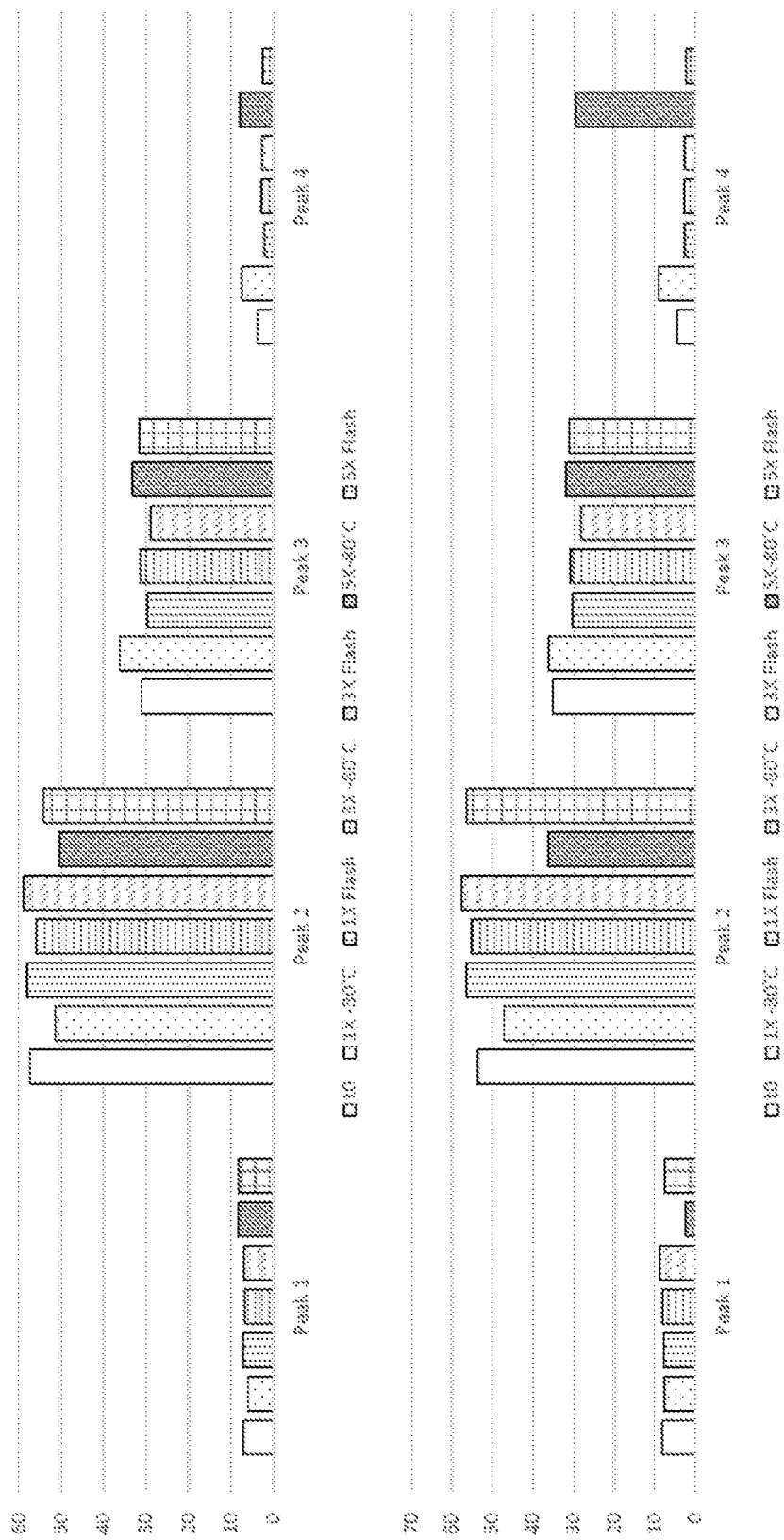
FIG. 4 is a set of bar chart panels that depict a freeze/thaw stability study and shows a distribution of different SP-D oligomeric species represented by either Peak 1, Peak 2, Peak 3 or Peak 4 of an AF4-MALLS analysis for lyophiles of rhSP-D that had been reconstituted at either 2 mg/ml (upper panel) or 4 mg/ml (lower panel), frozen by either flash liquid nitrogen freezing or in a −80° C. freezer, and thawed for 1, 3, or 5 freeze/thaw cycles.

Example results for the distribution of oligomeric species in reconstituted lyophiles are depicted in FIG. 4 (upper panel: 2 mg/ml; lower panel: 4 mg/ml). Example results for activities of samples in the bacterial aggregation assay, or the TLR4 assay are summarized in TABLE 18 and TABLE 19, respectively. In this study, there were no significant differences between 2 mg/ml and 4 mg/ml samples. Freezing the samples at −80° C. with five cycles, increased the Peak 4 aggregate for both 2 mg/ml and 4 mg/ml samples, compared to flash freezing with 5 cycles. Thus, the best freezing condition was flash freezing.

TABLE 18

Bacterial aggregation assay

| Conditions | Avg pEC$_{50}$ ± SD | EC$_{50}$ (mg/ml) | Avg E$_{max}$ ± SD (Curve Span) | N |
|---|---|---|---|---|
| 2 mg/mL, FT t0 | 3.9 | 0.000125 | 36.95 ± 7.411 | 1 |
| 4 mg/mL, FT t0 | 4.06 | 0.000087 | 50.48 ± 2.752 | 1 |
| 2 mg/mL, 1X F/T −80° C. | 3.97 | 0.0001071 | 43.65 ± 2.72 | 1 |
| 4 mg/mL, 1X F/T −80° C. | | | | |
| 2 mg/mL, 1X F/T Flash | | | | |
| 4 mg/mL, 1X F/T Flash | 4.0537 | 0.00008837 | 43.56 ± 3.155 | 1 |
| 2 mg/mL, 3X F/T −80° C. | | | | |
| 4 mg/mL, 3X F/T −80° C. | | | | |
| 2 mg/mL, 3X F/T Flash | 3.8752 | 0.0001333 | 44.08 ± 2.165 | 1 |
| 4 mg/mL, 3X F/T Flash | 4.1147 | 0.00007679 | 40.21 ± 3.277 | 1 |
| 2 mg/mL, 5X F/T −80° C. | | | | |
| 4 mg/mL, 5X F/T −80° C. | | | | |
| 2 mg/mL, 5X F/T Flash | | | | |
| 4 mg/mL, 5X F/T Flash | | | | |

TABLE 19

TLR4 assay

| Conditions | Avg pIC$_{50}$ ± SD | IC$_{50}$ (mg/ml) | Avg E$_{max}$ ± SD (Curve Span) | N |
|---|---|---|---|---|
| 2 mg/mL, FT t0 | 2.79 ± 0.16 | 0.0017 | 21.71 ± 6.90 | 3 |
| 4 mg/mL, FT t0 | 2.64 ± 0.16 | 0.0024 | 22.26 ± 3.46 | 3 |
| 2 mg/mL, 1X F/T −80° C. | 2.45 ± 0.22 | 0.0037 | 22.11 ± 0.28 | 2 |
| 4 mg/mL, 1X F/T −80° C. | 2.08 ± 0.02 | 0.0084 | 16.01 ± 2.80 | 2 |
| 2 mg/mL, 1X F/T Flash | 2.40 ± 0.08 | 0.0041 | 20.95 ± 0.05 | 2 |
| 4 mg/mL, 1X F/T Flash | 2.68 ± 0.15 | 0.0022 | 22.41 ± 2.13 | 2 |
| 2 mg/mL, 3X F/T −80° C. | 2.42 ± 0.09 | 0.0038 | 18.91 ± 1.78 | 2 |
| 4 mg/mL, 3X F/T −80° C. | 2.34 ± 0.51 | 0.0064 | 22.11 ± 8.36 | 3 |
| 2 mg/mL, 3X F/T Flash | no response | no response | no response | 5 |
| 4 mg/mL, 3X F/T Flash | no response | no response | no response | 5 |
| 2 mg/mL, 5X F/T −80° C. | 2.23 ± 0.06 | 0.006 | 19.23 ± 1.79 | 4 |

TABLE 19-continued

| | TLR4 assay | | | |
|---|---|---|---|---|
| Conditions | Avg $pIC_{50}$ ± SD | $IC_{50}$ (mg/ml) | Avg $E_{max}$ ± SD (Curve Span) | N |
| 4 mg/mL, 5X F/T −80° C. | 2.06 ± 0.19 | 0.0095 | 23.18 ± 4.91 | 4 |
| 2 mg/mL, 5X F/T Flash | 2.19 ± 0.07 | 0.0065 | 22.66 ± 7.46 | 3 |
| 4 mg/mL, 5X F/T Flash | 2.12 ± 0.14 | 0.0079 | 22.05 ± 5.21 | 4 |

Example 9—Stability of Reconstituted Formulations

Formulations of rhSP-D containing rhSP-D, 5 mM Histidine, 265 mM Lactose, and 5 mM $CaCl_2$, pH 6.0 were prepared. Solutions were lyophilized and reconstituted at either 2 mg/ml or 4 mg/ml rhSP-D, then held at t0; at 2-8° C. for 1 or 3 days; or at 25° C. for 1 or 3 days.

Figure 5:
FIG. 5 is a set of bar chart panels that depict a stability study for reconstituted lyophiles and shows a distribution of different SP-D oligomeric species represented by either Peak 1, Peak 2, Peak 3 or Peak 4 of an AF4-MALLS analysis for lyophiles of rhSP-D that had been reconstituted at either 2 mg/ml (upper panel) or 4 mg/ml (lower panel), and stored at either 5° C. or 25° C. for a period of 1 or 3 days.

Example results for the distribution of oligomeric species in reconstituted lyophiles are depicted in FIG. 5 (upper panel: 2 mg/ml; lower panel: 4 mg/ml). Example results for activities of samples in the TLR4 assay are summarized in TABLE 20. In this study, the distribution of oligomeric species was substantially stable for the various conditions for 2 mg/ml and 4 mg/ml formulations. There was no substantial difference between the distribution of oligomeric species for formulations held at either 5° C. and 25° C. for 3 days. Thus, reconstituted rhSP-D was stable at either 5° C. and 25° C. for 3 days. TABLE 20 shows that the potency of the rhSP-D in the reconstituted samples was not changed when the reconstituted sample was held for up to 3 days at either 4° C. or 25° C., providing additional evidence that the physical stability of the reconstituted formulation translated to retention of biological activity.

TABLE 20

| Conditions | Avg $pIC_{50}$ ± SD | $IC_{50}$ (mg/ml) | Avg $E_{max}$ ± SD (Curve Span) | N |
|---|---|---|---|---|
| 2 mg/mL, t0 | 2.50 ± 0.13 | 0.0033 | 27.40 ± 7.76 | 4 |
| 4 mg/mL, t0 | 2.47 ± 0.03 | 0.0034 | 25.07 ± 4.80 | 4 |
| 2 mg/mL, held at 4° C. for 1 day | 2.51 ± 0.07 | 0.0031 | 23.00 ± 2.51 | 3 |
| 2 mg/mL, held at 25° C. for 1 day | 2.64 ± 0.04 | 0.0023 | 22.20 ± 2.36 | 3 |
| 4 mg/mL, held at 4° C. for 1 day | 2.56 ± 0.06 | 0.0028 | 22.59 ± 3.22 | 4 |
| 4 mg/mL, held at 25° C. for 1 day | 2.46 ± 0.18 | 0.0036 | 27.91 ± 5.15 | 4 |
| 2 mg/mL, held at 4° C. for 3 days | 2.47 ± 0.05 | 0.0034 | 27.02 ± 6.99 | 4 |
| 2 mg/mL, held at 25° C. for 3 days | 2.42 ± 0.03 | 0.0038 | 27.55 ± 8.74 | 3 |
| 4 mg/mL, held at 4° C. for 3 days | 2.57 ± 0.07 | 0.0027 | 35.29 ± 1.35 | 4 |
| 4 mg/mL, held at 25° C. for 3 days | 2.39 ± 0.05 | 0.0041 | 22.74 ± 2.88 | 4 |

Example 10—Chemical Stability of Lyophilized Formulations

An RP HPLC assay was used to evaluate the stability of lyophilized SP-D samples. Twelve different formulations were prepared. The RP HPLC assay included the use of an Agilent PLRP column, 300 Å, 3 µm, 2.1×150 mm (PL1912-3301). The first gradient (Gradient 1) went from a fairly shallow gradient (1.7% B per min to 6% B per minute after six minutes. The result was detection of a main peak, as well minor peaks eluting both before and after the main peak for a reduced sample.

All of the samples displayed purities near 95% at t0 when analyzing reduced samples (TABLE 21). After five weeks of storage 25° C., there was no substantial change in the RP HPLC profiles in most of the sample; F11-02 and F12-02 which both contained NaCl showed the largest changes (TABLE 22). TABLE 23 lists relative areas of the peaks in the RP HPLC chormatograms of reduced SP-D samples for formulations at t0. TABLE 24 lists relative areas of peaks in RP HPLC chormatograms of reduced SP-D samples for formulations at t5 (five weeks at 25° C.).

TABLE 21

| Formulation | Main Peak | Pre-Peak | Post-Peaks |
|---|---|---|---|
| F01-02 | 95.4% | 1.2% | 3.4% |
| F02-02 | 95.8% | 0.3% | 3.9% |
| F03-02 | 95.0% | 1.0% | 3.9% |
| F04-02 | 95.7% | 0.7% | 3.6% |
| F05-02 | 96.2% | 0.3% | 3.5% |
| F06-02 | 94.7% | 0.4% | 4.9% |
| F07-02 | 95.9% | 1.0% | 3.2% |
| F08-02 | 95.5% | 0.8% | 3.7% |
| F09-02 | 95.3% | 1.1% | 3.6% |
| F10-02 | 95.7% | 1.3% | 3.0% |
| F11-02 | 96.5% | 0.4% | 3.1% |
| F12-02 | 96.5% | 0.7% | 2.9% |

TABLE 22

| Formulation | Main Peak | Pre-Peak | Post-Peaks |
|---|---|---|---|
| F01-02 | 95.3% | 1.3% | 3.5% |
| F02-02 | 95.6% | 0.4% | 4.1% |
| F03-02 | 95.4% | 0.7% | 3.9% |
| F04-02 | 95.6% | 0.9% | 3.6% |
| F05-02 | 95.8% | 0.5% | 3.8% |
| F06-02 | 95.9% | 0.4% | 3.6% |
| F07-02 | 95.9% | 0.9% | 3.2% |
| F08-02 | 96.0% | 0.9% | 3.2% |
| F09-02 | 95.3% | 1.1% | 3.7% |
| F10-02 | 95.3% | 1.0% | 3.7% |
| F11-02 | 96.0% | 0.8% | 3.2% |
| F12-02 | 95.2% | 1.0% | 3.8% |

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed is:

1. A pharmaceutical composition comprising:
   from about 0.1 mg/ml to about 10 mg/ml of a recombinant human surfactant protein D (rhSP-D);
   from about 3 mM to about 7 mM of a histidine buffer;
   from 200 mM to 300 mM of a sugar, and
   from about 0.1 mM to about 10 mM of a calcium salt.

2. The pharmaceutical composition of claim 1, wherein the sugar is selected from the group consisting of sucrose, maltose, lactose, glucose, fructose, galactose, mannose, arabinose, xylose, ribose, rhamnose, trehalose, sorbose, melezitose, raffinose, thioglucose, thiomannose, thiofructose, octa-O-acetyl-thiotrehalose, thiosucrose, and thiomaltose.

3. The pharmaceutical composition of claim 2, wherein the sugar is lactose.

4. The pharmaceutical composition of claim 1, wherein the calcium salt is selected from the group consisting of calcium chloride, calcium bromide, calcium acetate, calcium sulfate, and calcium citrate.

5. The pharmaceutical composition of claim 4, wherein the calcium salt is calcium chloride.

6. The pharmaceutical composition of claim 5, wherein the concentration of the calcium chloride is from about 1 mM to about 7 mM.

7. The pharmaceutical composition of claim 1, having a pH from about 4.0 to about 9.0.

8. The pharmaceutical composition of claim 7, having a pH from about 5.5 to about 6.5.

9. The pharmaceutical composition of claim 1, wherein the concentration of the rhSP-D is from about 1 mg/ml to about 5 mg/ml.

10. The pharmaceutical composition of claim 1 comprising a population of rhSP-D polypeptides having oligomeric forms, wherein greater than 30% of the oligomeric forms comprise dodecamers of rhSP-D.

11. The pharmaceutical composition of claim 1 comprising a population of rhSP-D polypeptides having oligomeric forms, wherein less than 15% of the oligomeric forms comprise aggregates of the rhSP-D, wherein the aggregates have a radius greater than 70 nm.

12. The pharmaceutical composition of claim 1, further comprising a bulking agent selected from the group consisting of mannitol, xylitol, sorbitol, maltitol, lactitol, glycerol, erythritol, arabitol, glycine, alanine, threonine, valine, and phenylalanine.

13. The pharmaceutical composition of claim 1, wherein the composition lacks a chelating agent selected from EDTA and EGTA.

14. The pharmaceutical composition of claim 1 selected from the group consisting of:
   1 mg/ml rhSP-D, 5 mM Histidine, 265 mM Lactose, 5 mM calcium chloride, wherein the solution has a pH 6.0;
   2 mg/ml rhSP-D, 5 mM histidine, 265 mM lactose, 5 mM calcium chloride, wherein the solution has a pH of 6.0;
   2 mg/ml rhSP-D, 5 mM Histidine, 265 mM Lactose, 1 mM calcium chloride, wherein the solution has a pH 6.0; and
   4 mg/ml rhSP-D, 5 mM Histidine, 265 mM Lactose, 5 mM calcium chloride, wherein the solution has a pH 6.0.

15. The pharmaceutical composition of claim 1, wherein the rhSP-D polypeptide comprises the amino acid sequence of SEQ ID NO:02, and wherein the rhSP-D polypeptide has activity in a bacterial aggregation assay or in a TLR4 inhibition assay.

16. A lyophile of the pharmaceutical composition of claim 1.

17. An article comprising a container comprising a lyophile of the pharmaceutical composition of claim 1.

18. A method of preparing a lyophile comprising lyophilizing the pharmaceutical composition of claim 1.

19. A method of preparing a pharmaceutical composition comprising contacting a lyophile of the pharmaceutical composition of claim 1 with a pharmaceutically acceptable diluent to form a solution or suspension of the rhSP-D.

20. The method of claim 19, wherein the diluent is suitable for administration to a lung.

21. The method of claim 19, wherein the diluent is sterile water.

22. The method of claim 19, wherein the solution or suspension has a concentration of the rhSP-D from about 3 mg/ml to about 5 mg/ml.

* * * * *

SEQUENCE LISTING

<160> NUMBER OF SEQ ID NOS: 2

<210> SEQ ID NO 1
<211> LENGTH: 375
<212> TYPE: PRT
<213> ORGANISM: Homo sapiens

<400> SEQUENCE: 1

```
Met Leu Leu Phe Leu Leu Ser Ala Leu Val Leu Leu Thr Gln Pro Leu
1               5                   10                  15

Gly Tyr Leu Glu Ala Glu Met Lys Thr Tyr Ser His Arg Thr Met Pro
            20                  25                  30

Ser Ala Cys Thr Leu Val Met Cys Ser Ser Val Glu Ser Gly Leu Pro
        35                  40                  45

Gly Arg Asp Gly Arg Asp Gly Arg Glu Gly Pro Arg Gly Glu Lys Gly
    50                  55                  60

Asp Pro Gly Leu Pro Gly Ala Ala Gly Gln Ala Gly Met Pro Gly Gln
65                  70                  75                  80

Ala Gly Pro Val Gly Pro Lys Gly Asp Asn Gly Ser Val Gly Glu Pro
                85                  90                  95

Gly Pro Lys Gly Asp Thr Gly Pro Ser Gly Pro Pro Gly Pro Pro Gly
            100                 105                 110

Val Pro Gly Pro Ala Gly Arg Glu Gly Pro Leu Gly Lys Gln Gly Asn
        115                 120                 125

Ile Gly Pro Gln Gly Lys Pro Gly Pro Lys Gly Glu Ala Gly Pro Lys
    130                 135                 140

Gly Glu Val Gly Ala Pro Gly Met Gln Gly Ser Ala Gly Ala Arg Gly
145                 150                 155                 160

Leu Ala Gly Pro Lys Gly Glu Arg Gly Val Pro Gly Glu Arg Gly Val
                165                 170                 175

Pro Gly Asn Thr Gly Ala Ala Gly Ser Ala Gly Ala Met Gly Pro Gln
            180                 185                 190

Gly Ser Pro Gly Ala Arg Gly Pro Pro Gly Leu Lys Gly Asp Lys Gly
        195                 200                 205

Ile Pro Gly Asp Lys Gly Ala Lys Gly Glu Ser Gly Leu Pro Asp Val
    210                 215                 220

Ala Ser Leu Arg Gln Gln Val Glu Ala Leu Gln Gly Gln Val Gln His
225                 230                 235                 240

Leu Gln Ala Ala Phe Ser Gln Tyr Lys Lys Val Glu Leu Phe Pro Asn
                245                 250                 255

Gly Gln Ser Val Gly Glu Lys Ile Phe Lys Thr Ala Gly Phe Val Lys
            260                 265                 270

Pro Phe Thr Glu Ala Gln Leu Leu Cys Thr Gln Ala Gly Gly Gln Leu
        275                 280                 285

Ala Ser Pro Arg Ser Ala Ala Glu Asn Ala Ala Leu Gln Gln Leu Val
    290                 295                 300

Val Ala Lys Asn Glu Ala Ala Phe Leu Ser Met Thr Asp Ser Lys Thr
305                 310                 315                 320

Glu Gly Lys Phe Thr Tyr Pro Thr Gly Glu Ser Leu Val Tyr Ser Asn
                325                 330                 335

Trp Ala Pro Gly Glu Pro Asn Asp Gly Gly Ser Glu Asp Cys Val
            340                 345                 350

Glu Ile Phe Thr Asn Gly Lys Trp Asn Asp Arg Ala Cys Gly Glu Lys
        355                 360                 365
```

```
Arg Leu Val Val Cys Glu Phe
    370             375

<210> SEQ ID NO 2
<211> LENGTH: 355
<212> TYPE: PRT
<213> ORGANISM: Homo sapiens

<400> SEQUENCE: 2

Ala Glu Met Lys Thr Tyr Ser His Arg Thr Met Pro Ser Ala Cys Thr
1               5                   10                  15

Leu Val Met Cys Ser Ser Val Glu Ser Gly Leu Pro Gly Arg Asp Gly
                20                  25                  30

Arg Asp Gly Arg Glu Gly Pro Arg Gly Glu Lys Gly Asp Pro Gly Leu
            35                  40                  45

Pro Gly Ala Ala Gly Gln Ala Gly Met Pro Gly Gln Ala Gly Pro Val
    50                  55                  60

Gly Pro Lys Gly Asp Asn Gly Ser Val Gly Glu Pro Gly Pro Lys Gly
65              70                  75                  80

Asp Thr Gly Pro Ser Gly Pro Pro Gly Pro Gly Val Pro Gly Pro
                85                  90                  95

Ala Gly Arg Glu Gly Pro Leu Gly Lys Gln Gly Asn Ile Gly Pro Gln
            100                 105                 110

Gly Lys Pro Gly Pro Lys Gly Glu Ala Gly Pro Lys Gly Glu Val Gly
        115                 120                 125

Ala Pro Gly Met Gln Gly Ser Ala Gly Ala Arg Gly Leu Ala Gly Pro
    130                 135                 140

Lys Gly Glu Arg Gly Val Pro Gly Glu Arg Gly Val Pro Gly Asn Thr
145                 150                 155                 160

Gly Ala Ala Gly Ser Ala Gly Ala Met Gly Pro Gln Gly Ser Pro Gly
                165                 170                 175

Ala Arg Gly Pro Pro Gly Leu Lys Gly Asp Lys Gly Ile Pro Gly Asp
            180                 185                 190

Lys Gly Ala Lys Gly Glu Ser Gly Leu Pro Asp Val Ala Ser Leu Arg
        195                 200                 205

Gln Gln Val Glu Ala Leu Gln Gly Gln Val Gln His Leu Gln Ala Ala
    210                 215                 220

Phe Ser Gln Tyr Lys Lys Val Glu Leu Phe Pro Asn Gly Gln Ser Val
225                 230                 235                 240

Gly Glu Lys Ile Phe Lys Thr Ala Gly Phe Val Lys Pro Phe Thr Glu
                245                 250                 255

Ala Gln Leu Leu Cys Thr Gln Ala Gly Gly Gln Leu Ala Ser Pro Arg
            260                 265                 270

Ser Ala Ala Glu Asn Ala Ala Leu Gln Gln Leu Val Val Ala Lys Asn
        275                 280                 285

Glu Ala Ala Phe Leu Ser Met Thr Asp Ser Lys Thr Glu Gly Lys Phe
    290                 295                 300

Thr Tyr Pro Thr Gly Glu Ser Leu Val Tyr Ser Asn Trp Ala Pro Gly
305                 310                 315                 320

Glu Pro Asn Asp Asp Gly Gly Ser Glu Asp Cys Val Glu Ile Phe Thr
                325                 330                 335
```

```
Asn Gly Lys Trp Asn Asp Arg Ala Cys Gly Glu Lys Arg Leu Val Val
            340                 345                 350
Cys Glu Phe
    355
```